(12) United States Patent
Masserant

(10) Patent No.: US 11,402,164 B2
(45) Date of Patent: Aug. 2, 2022

(54) COOLING TOWER WATER DIVERSION SYSTEM AND METHOD

(71) Applicant: Mid-American Gunite, Inc., Newport, MI (US)

(72) Inventor: Keith Masserant, Newport, MI (US)

(73) Assignee: Mid-American Gunite, Inc., Newport, MI (US)

(*) Notice: Subject to any disclaimer, the term of this patent is extended or adjusted under 35 U.S.C. 154(b) by 73 days.

(21) Appl. No.: 17/040,425

(22) PCT Filed: May 22, 2019

(86) PCT No.: PCT/US2019/033553
§ 371 (c)(1),
(2) Date: Sep. 22, 2020

(87) PCT Pub. No.: WO2019/226787
PCT Pub. Date: Nov. 28, 2019

(65) Prior Publication Data
US 2021/0063100 A1 Mar. 4, 2021

Related U.S. Application Data

(60) Provisional application No. 62/675,168, filed on May 22, 2018.

(51) Int. Cl.
*F28F 25/04* (2006.01)
*F28C 1/04* (2006.01)
(52) U.S. Cl.
CPC ............... *F28F 25/04* (2013.01); *F28C 1/04* (2013.01)
(58) Field of Classification Search
CPC .............. F28C 1/04; F28F 25/04; F28F 27/02

USPC .......................................... 261/110, DIG. 11
See application file for complete search history.

(56) References Cited

U.S. PATENT DOCUMENTS

| | | | |
|---|---|---|---|
| 3,794,304 A * | 2/1974 | Cates | F28F 25/02 261/DIG. 11 |
| 3,880,964 A * | 4/1975 | Fordyce | F28F 25/04 261/DIG. 11 |
| 4,032,604 A | 6/1977 | Parkinson et al. | |
| 4,048,265 A | 9/1977 | Fordyce et al. | |
| 4,241,283 A | 12/1980 | Storer, Sr. | |

(Continued)

OTHER PUBLICATIONS

International search report dated Aug. 6, 2019 for the international application No. PCT/US1933553.

*Primary Examiner* — Charles S Bushey
(74) *Attorney, Agent, or Firm* — Quinn IP Law

(57) ABSTRACT

A system and method for installing a water diversion system to a cooling tower flume and distribution basin to dam a section of the basin includes installing first and second basin dams extending radially from respective first and second parapets of the flume wall to the basin wall in sealing contact with a basin floor, blocking water from flowing from the undammed section of the basin into the dammed section using the basin dams, and installing a flume dam to each notch of one or more notches distributed peripherally along the flume wall between the first and second parapets, blocking water from flowing from the flume into the distribution basin through the one or more notches using the flume dam, and such that the flume dams installed to the one or more notches in combination with the first and second basin dams define a dammed section of the basin.

21 Claims, 13 Drawing Sheets

(56) References Cited

U.S. PATENT DOCUMENTS

| | | |
|---|---|---|
| 4,267,978 A | 5/1981 | Manteufel |
| 4,579,692 A | 4/1986 | Bugler, III et al. |
| 4,706,554 A | 11/1987 | Baldino et al. |
| 9,400,140 B2 * | 7/2016 | Hicks ........................ F28C 1/02 |

* cited by examiner

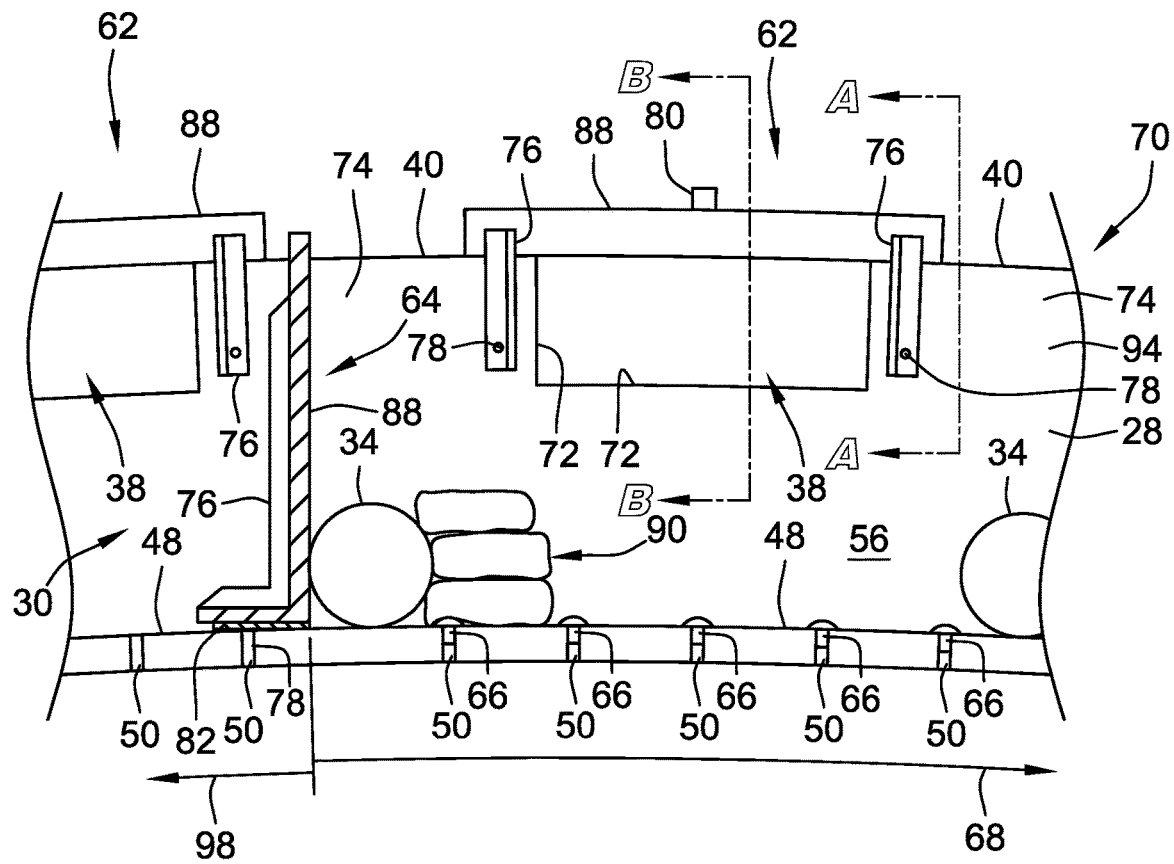
FIG. 21
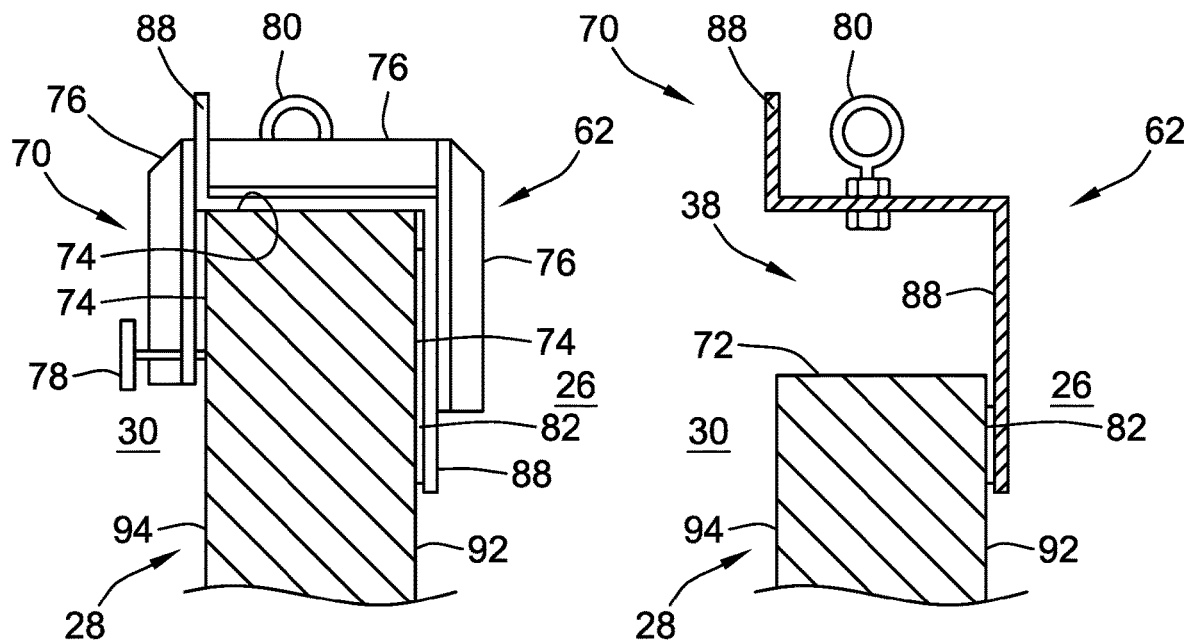
FIG. 22  FIG. 23

COOLING TOWER WATER DIVERSION SYSTEM AND METHOD

CROSS REFERENCE TO RELATED APPLICATIONS

This application claims the benefit of U.S. Provisional Application 62/675,168 filed May 22, 2018, which is hereby incorporated by reference in its entirety.

TECHNICAL FIELD

The present disclosure relates to a system and method for selectively and temporarily diverting water from a section of a distribution basin of a cooling tower.

BACKGROUND

Cooling tower operation is essential to the operation of a nuclear power plant. Non-critical maintenance activities, including maintenance and repair activities such as inspection, cleaning, descaling, desliming, and repair of hot water distribution and cold water collection basins; inspection, cleaning, descaling and replacement of fill bars, structural concrete inspection and repair and the like, which improve the efficiency of the cooling function performed by the cooling tower and in turn, improve the efficiency of the power plant, are typically deferred until the nuclear power plant is in a cold outage condition, e.g., shut down. A planned shutdown of a power plant, where the power plant is shut down to a cold outage condition, may occur on a planned schedule, for example, when refueling the nuclear reactor core, which may only occur every 18 to 24 months. Deferring non-critical maintenance activities for an extended period of time, such as the time period until the next planned cold outage, results in reduced operating efficiency of the power plant due to scale and slime build-up, fill aging and deterioration, etc. which can cause cooling efficiency loss overtime.

During a cold outage shutdown, workers are typically scheduled around the clock (24/7), regardless of weather condition, to maximize the amount of deferred maintenance work completed during the cold outage shutdown and to support completion of project work prior to re-start up of the power plant start, where around the clock (24/7) work scheduling can result in worker fatigue, the use of temporary workers, working in suboptimal weather conditions, overtime costs, etc.

SUMMARY

By developing a system and method to temporarily divert water flow from a selected portion of a cooling tower, maintenance activities can be performed in the portion of the cooling tower from which the water is diverted without having to wait for a cold outage shutdown of the nuclear power plant. The system and method described herein provides a means to temporarily divert water flow from a selected portion of a cooling tower while maintaining water flow through the remaining portion of the cooling tower, such that operation of the nuclear power plant can continue uninterrupted while performing maintenance activities on the selected portion of the cooling tower. During experimental trials using the system described herein to divert water from a selected portion of the cooling tower, measurements and observations were made related to cooling efficiency, tower loading and vibration analysis, water flow-through capacity, and gross megawatt output of the nuclear power plant operating in conjunction with the cooling tower. As an unexpected result and advantage, no loss in cooling capacity or cooling efficiency was observed during the periods of time water was diverted from selected portions of the cooling tower using the method and system described herein, e.g., the cooling tower cooling capacity was unchanged when operating the cooling tower with one or more sections of the distribution basin dammed off as described in further detail herein. Further, after performing maintenance in the dammed off sections and subsequently undamming the sections to restore the cooling tower to full cooling capacity, increases in gross megawatt output from the power plant were realized due to increases in cooling capacity resultant from the maintenance performed in the previously dammed sections, e.g., at increased frequencies as compared with the deferred maintenance previously performed only during cold shutdown outages. The system and method described herein is further advantaged by the ability to select prime and/or optimized weather conditions to perform the cooling tower maintenance activity, using a dedicated team of workers during a 40-hour work week, where the workers have been trained in advance in the use of the methods described herein. Advantageously, during experimental trials using this method and system, focusing primarily on equipment reliability and efficiency gains through fill replacement and concrete repair, numerous advantages were realized, including maintenance and repair activities performed on the cooling tower were completed without an OSHA recordable injury, man-hour savings were realized by the use of a stable and experienced workforce and providing a dry workplace, cooling tower efficiency recovered 4 to 6 degrees Fahrenheit of cooling capacity, and the nuclear power plant realized an increase of gross megawatt output of 4 to 6 MWE (Megawatt electric) as compared with the same period prior to performance of the experimental trials.

The system and method described herein includes installing a diversion system to dam off sections of the flume and the hot water distribution basin of the cooling tower, thus creating a dammed section of the distribution basin to isolate the flow of water away from targeted work areas within the dammed section, while diverting the displaced water throughout the remaining active sections of the cooling tower. Residual leak-by of water, e.g., water draining through the conduits in the floor of the distribution basin to the fill structure below, from the dammed section of the distribution basin is controlled by plugging of the conduits and/or flow-through apertures in the distribution basin to ensure the work areas remain as dry zones, including work areas of the targeted sections of the cooling tower in the fill structure underneath the dammed section of the distribution basin. Following completion of the targeted work, the diversion system is removed to restore water flow to the targeted work area. The system can then be redeployed to another section of the cooling tower such that preventive and corrective maintenance can occur on a continuing basis progressing from one section of the cooling tower to another, and such that increases in cooling efficiency and power plant output resulting from the completion of such continuous maintenance can be realized months ahead of scheduled cold outages. Based on the experimental trials, the size of the water diversion area, also referred to herein as the dammed section, was tuned to support maximum workability without impacting power plant operation. Tuning actions included, for example, determining the maximum size of the water diversion area, evaluating the work environment including, by way of non-limiting example, conditions such as ambient temperature (outside temperature), wind direction and magnitude, incoming water temperature, current cooling tower efficiency performance, etc.

By way of non-limiting example, a water diversion system is described herein for use with a crossflow cooling tower which includes a generally annular hot water distribution basin, a generally annular flume, and a flume wall including a plurality of parapets and a plurality of notches distributed peripherally along the flume wall such that each parapet is separated from an adjacent parapet by a notch. The hot water distribution basin includes a basin floor which can include a plurality of conduits such as baffles and/or apertures such that water can flow from the distribution basin through the basin floor and into a fill structure disposed below the basin floor, for distribution over a plurality of fill members. The distribution basin further includes a basin wall at the outermost periphery of the distribution basin. The flume wall is intermediate the distribution basin and the flume such that water is flowable from the flume into the distribution basin via each of the plurality of notches and is retained in the distribution basin by the flume wall and the basin wall until the water drains through the baffles and apertures included in the basin floor. The water diversion system, in one example, includes a first flume dam which in an installed position is removably attached to a first parapet and a second parapet of the flume wall, such that the first flume dam is positioned in a first notch which is intermediate the first and second parapets. In the installed position the first flume dam is configured to seal to the surface of the notch such that the first flume dam blocks the flow of water from the flume through the first notch and into the distribution basin. The water diversion system further includes a first basin dam and a second basin dam. In an installed position the first basin dam extends radially from the first parapet to the basin wall and the second basin dam extends radially from the second parapet to the basin wall, such that a dammed section of the basin is defined between the first and second basin dams. The first and second basin dams each seal to the basin floor, basin wall and flume wall to block the flow of water into the dammed section from the remainder of the distribution basin.

In one example, one or both of the flume dam and the basin dam can include a sealing element, such as a gasket, sealing interface, or the like, which interfaces with the contacted surfaces to seal the dam and block water flow to the dammed section. In one example, the basin dam can be configured to abut another structure in the distribution basin, such as a radial pipe, and such that the force of the water retained by the basin dam seals the dam to the surface of the distribution basin to block water flow to the dammed section. One or both of the basin dam and the flume dam can include one or more of a bracket for fitting the dam to its mating surface, can receive one or more fasteners for fastening the dam in position, and/or can include a lifting member for handling and positioning the dam during installation of the dam to and removal from the dam from the cooling tower. In one example, a crane or similar lifting device can be used for transferring the basin dam and/or the flume dam to the upper deck of the cooling tower and/or during installation.

In one example, the water diversion system can include a plurality of plugs which are configured to plug the conduits, baffles and/or apertures in the basin floor, to block the flow of any residual water in the dammed section of the distribution basin from flowing through the conduits, baffles and/or apertures into the fill structure disposed below the dammed section. For example, this would include preventing rainwater which may accumulate in the dammed section from traveling through the conduits and from falling on workers performing maintenance tasks in the fill structure below the dammed section. The plugs are configured for removal from the conduits after maintenance is completed.

In one example, the water diversion system is configured for installation to a cooling tower including a generally annular flume defining a flume wall, the flume wall disposed between the flume and a generally annular distribution basin, where the flume wall comprises a plurality of parapets and a plurality of notches distributed peripherally along the flume wall such that each parapet is separated from an adjacent parapet by a notch and such that water is flowable from the flume into the distribution basin via the notch, and where the basin is defined by a basin floor extending radially between the flume wall and a basin wall. In an illustrative example, the cooling tower is configured as a crossflow cooling tower including a fill structure disposed beneath the distribution basin, where, during operation of the cooling tower, water is drained undammed sections of the distribution basin and distributed to the fill structure via a plurality of conduits defined by the basin floor of the distribution basin. The water diversion system comprises a first flume dam where with the flume dam in an installed position the first flume dam is removably attached to a first parapet and a second parapet to block a first notch separating the first and second parapets, and in the installed position the first flume dam is configured to block water from flowing through the first notch from the flume into the distribution basin. The system further comprises a first basin dam and a second basin dam. In an installed position, the first basin dam extends radially from the first parapet to the basin wall in sealing contact with the basin floor. In an installed position the second basin dam extends radially from the second parapet to the basin wall in sealing contact with the basin floor. In one example, the basin dam can include a dam plate for sealing the basin dam to each of the basin floor, the flume wall, and the basin wall. The basin dam can include a sealing element where in the installed position, the sealing element is disposed between the dam plate and the basin floor. The first flume dam and the first and second basin dams define a dammed section of the basin extending between the first and second basin dams, such that, in the installed position the first and second basin dams block water from flowing into the dammed section from an undammed section of the distribution basin.

The system can further include second and third flume dams, also referred to herein as adjacent flume dams, where in an installed position the second flume dam is removably attached to the first parapet and a third parapet to block a second notch separating the first and third parapets as an adjacent flume dam, such that the second flume dam blocks water from flowing through the second notch from the flume into the undammed section of the distribution basin immediately adjacent the first basin dam, and where in an installed position the third flume dam is removably attached to the second parapet and a fourth parapet as an adjacent flume dam, to block a third notch separating the second and fourth parapets such that the third flume dam is configured to block water from flowing through the third notch from the flume into the undammed section of the distribution basin immediately adjacent the second basin dam. The system can further include at least one auxiliary basin dam, where in an installed position the auxiliary basin dam extends radially from the flume wall to the basin wall and is positioned in the dammed section adjacent one of the first and second basin dams, to block water from flowing into the working area of the dammed section and/or to provide a redundant or secondary dam structure in the event of water flow over the adjacent basin dam.

In one example, the basin floor includes at least one conduit, also referred to herein as an aperture or baffle, for draining water from the distribution basin through the basin floor, where the water exiting the distribution basin via the at least one conduit is distributed over the fill structure disposed below the distribution basin for cooling. In this example, the system can further include at least one plug for plugging the at least one conduit in the dammed section, where in an installed position the at least one plug is removably installed in the at least one conduit to seal the conduit and to block water from flowing from the distribution basin through the conduit to the fill structure below. As such, plugging the conduits blocks water which is residual in the dammed section or which accumulates in the dammed section, for example, from overspray from the flume or rainfall, from draining through the conduits and falling onto workers who may be present and/or performing maintenance in the fill structure below the dammed section.

The flume wall includes a flume face defined by the side of the flume wall facing the flume, and a basin face defined by the side of the flume wall facing the distribution basin. Further, each parapet defines a parapet surface including a portion of the flume face, a portion of the basin face, and a top surface of the parapet. In one example, the flume dam includes a dam plate for sealing the flume dam to the flume face of the flume wall. In one example, the flume dam includes at least one bracket attached to the dam plate, where in the installed position, the at least one bracket is configured to conform to the parapet surface. The flume dam can include a bracket at each end of the dam plate, such that with the flume dam installed to the notch, the bracket at the first end of the dam plate conforms with the parapet surface of the first parapet defining the notch, and the bracket at the second end of the dam plate conforms with the parapet surface of the second parapet defining the notch. In one example, the brackets are configured as reinforcement brackets, for example, including a flange to strengthen and/or stabilize the dam plate. In one example, the bracket extends over the top surface and down the flume and basin faces of the parapet to substantially conform to the parapet surface. The flume dam can include at least one fastener for removably attaching the at least one bracket to the parapet. The fastener and/or the bracket can be configured such that, in an installed position the fastener and/or the bracket compresses the dam plate against the flume face of the flume wall, to increase sealing conformance of the dam plate to the flume face. In one example, the flume dam includes a sealing element where in the installed position, the sealing element is disposed between the dam plate and the flume face. In one example, the sealing element can be configured as a gasket to seal the dam plate to the flume face. The gasket can be compressed by the bracket and/or the fastener against the flume face, to increase conformance of the gasket to the flume face.

A method for installing the water diversion system to a cooling tower to form a dammed section of the distribution basin is described herein, the cooling tower including a generally annular flume defining a flume wall, the flume wall disposed between the flume and a generally annular distribution basin, where the flume wall comprises a plurality of parapets and a plurality of notches distributed peripherally along the flume wall such that each parapet is separated from an adjacent parapet by a notch and such that water is flowable from the flume into the distribution basin via the notch, and where the basin is defined by a basin floor extending radially between the flume wall and a basin wall. In an illustrative example, the cooling tower is configured as a crossflow cooling tower including a fill structure disposed beneath the distribution basin, where, during operation of the cooling tower, water is drained undammed sections of the distribution basin and distributed to the fill structure via a plurality of conduits defined by the basin floor of the distribution basin. The method includes installing a first basin dam in sealing contact with the basin floor where in an installed position the first basin dam extends radially from a first parapet of the flume wall to the basin wall; and installing a second basin dam in sealing contact with the basin floor where in an installed position the second basin dam extends radially from a second parapet of the flume wall to the basin wall. The method further includes installing a flume dam to each notch of one or more notches distributed peripherally along the flume wall between the first and second parapets, thereby blocking water from flowing from the flume into the distribution basin through one or more notches, using the flume dam, and such that the flume dams installed to the one or more notches in combination with the first and second basin dams define a dammed section of the basin extending between the first and second basin dams.

In one example, the method can further include installing a first adjacent flume dam to a first adjacent notch in the flume wall where the first adjacent notch is defined by the first parapet and is located in the undammed section immediately adjacent to the dammed section and the first basin dam, such that the first adjacent flume dam blocks water from flowing from the flume into the undammed section of the distribution basin through the at first adjacent notch; and installing a second adjacent flume dam to a second adjacent notch in the flume wall where the second adjacent notch is defined by the second parapet and is located in the undammed section immediately adjacent to the dammed section and the second basin dam, thereby blocking water from flowing from the flume into the undammed section of the distribution basin through the second adjacent notch. In this example, the first and second adjacent flume dams are positioned outside of and adjacent to the dammed section such that the adjacent flume dams divert water to undammed flumes which are non-adjacent to the dammed section of the distribution basin, to decrease the flow of water into the undammed sections immediately adjacent the first and second basin dam, to minimize turbulence of the water in the undammed sections immediately adjacent the first and second basin dam and to minimize splash over from the flume into the dammed section.

In one example, the method can further include installing an auxiliary basin dam in sealing contact with the basin floor such that in an installed position the auxiliary basin dam extends radially from the flume wall to the basin wall and is positioned in the dammed section adjacent one of the first and second basin dams. In one example, the auxiliary basin dam can be formed of a plurality of portable dam sections, such as sand bags, which may be arranged and/or interlocked to form the auxiliary basin dam. In another example, the auxiliary basin dam can be configured as a basin dam, which can be positioned in the distribution basin, for example, using one or more fasteners. In one example, where the basin floor comprises one or more conduits for distributing water through the basin floor via the one or more conduits, such as in a cross-cooling tower, the method can include installing a plug to each conduit of the one or more conduits, such that in an installed position the plug is removably installed to and/or inserted in the at least one conduit to seal the conduit, thereby blocking water from flowing from the distribution basin through the conduit, using the plug.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 21 is a schematic partial annular cross-sectional view of the upper deck of FIG. 3 showing a basin dam and an auxiliary basin dam separating a dammed section from an undammed section, and further showing flume dams installed in the notches included in and immediately adjacent to the dammed section, according to a method for diverting water from the dammed section as further described herein;

FIG. 22 is a schematic partial radial cross-sectional view of cross-section A-A of FIG. 21, showing the flume dam installed in the notch of the flume wall; and FIG. 23 is a schematic partial radial cross-sectional view of cross-section B-B of FIG. 21, showing the flume dam installed in the notch of the flume wall.

DETAILED DESCRIPTION

Figure 1:
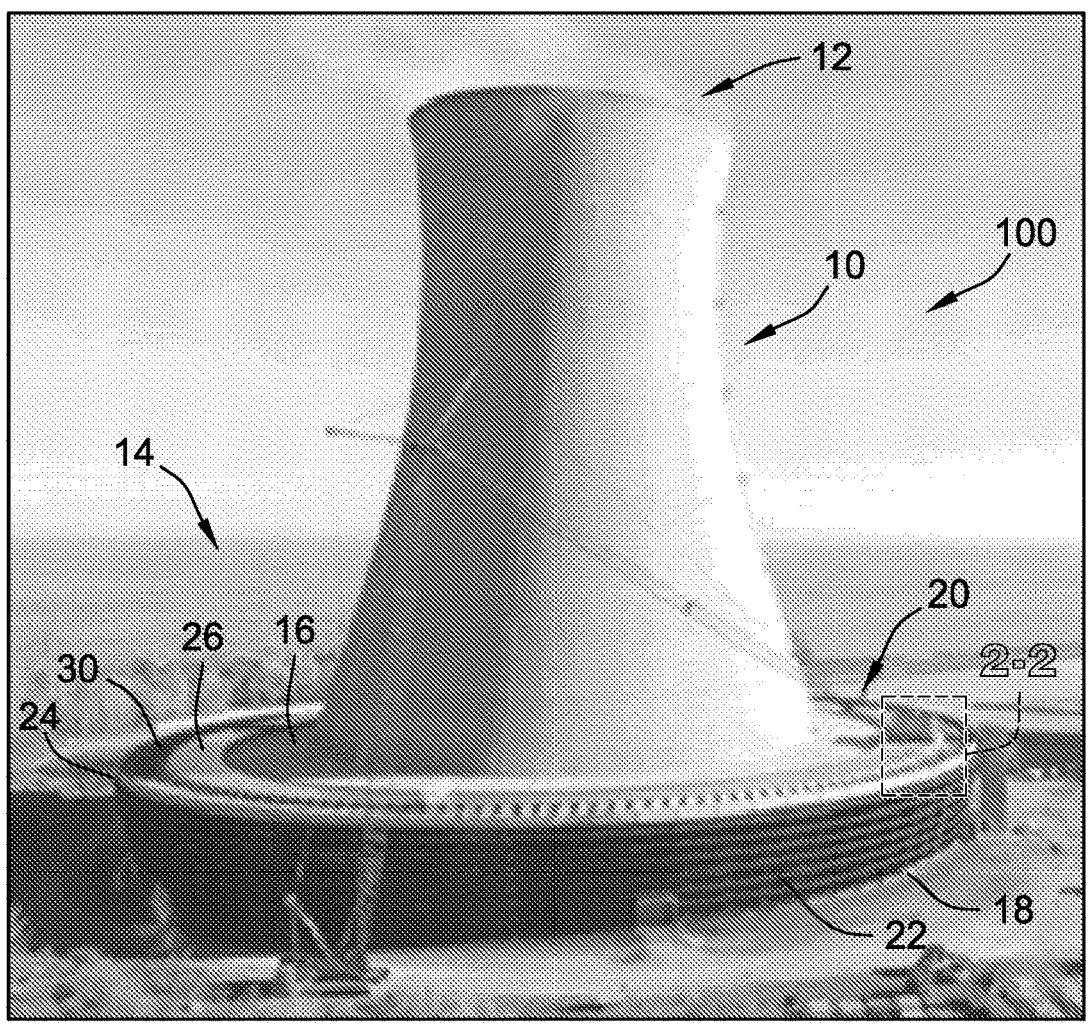
FIG. 1 is a photographic image of perspective side view of a crossflow cooling tower to which the water diversion system described herein can be installed.

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein. The following listing of elements shown in FIGS. 1-23 is provided for reference only, and is not intended to be limiting:

- 10 Hyperbolic shell
- 12 Air outlet
- 14 Upper deck
- 16 Canopy
- 18 Cold water collection basin
- 20 Cooling portion
- 22 Peripheral face
- 24 Peripheral wall
- 26 Flume
- 28 Flume wall
- 30 Hot water distribution basin
- 32 Basin wall
- 34 De-icing pipes
- 36 Peripheral trough
- 38 Notch
- 40 Parapet
- 42 Louver
- 44 Fill structure
- 46 Fill members
- 48 Basin floor
- 50 Conduit
- 52 Path of incoming air
- 54 Path of exiting air
- 56 Bay (Bx of Bn bays)
- 58 Radial border of bay
- 60 Cooling zone (Zx of Zn zones)
- 62 Flume dam
- 64 Basin dam
- 66 Plug
- 68 Dammed section
- 70 Water diversion system
- 72 Notch surface
- 74 Parapet surface
- 76 Dam bracket
- 78 Dam fastener
- 80 Lifting member
- 82 Sealing element
- 84 First end of basin dam
- 86 Second end of basin dam
- 88 Dam plate
- 90 Auxiliary basin dam
- 92 Flume face of flume wall
- 94 Basin face of flume wall
- 96 Canopy wall
- 98 Undammed section
- 100 Cooling tower
- 200 Method Referring to the drawings wherein like reference numbers represent like components throughout the several figures, the elements shown in FIGS. 1-23 are not necessarily to scale or proportion. Accordingly, the particular dimensions and applications provided in the drawings presented herein are not to be considered limiting. FIG. 1 shows a photographic image of a cooling tower 100 to which a water diversion system 70 (see FIGS. 8-23), as further described herein, can be installed to divert water from one or more bays 56 (see FIG. 2 and FIGS. 17-20) of a hot water distribution basin 30 to provide a dammed section 68 (see FIGS. 5, 8-11 and FIGS. 20-21) which is drained of water and to which the flow of water from the flume 26 and the undammed section 98 has been blocked by installation of the water diversion system 70, such that maintenance can be performed in the dammed section 68 and in the cooling zones 60 including the fill structure 44 located beneath the dammed section 68 of the hot water distribution basin 30. In an illustrative example, the cooling tower 100 is configured as a crossflow cooling tower, such as a natural draft crossflow cooling tower.

Figure 3:
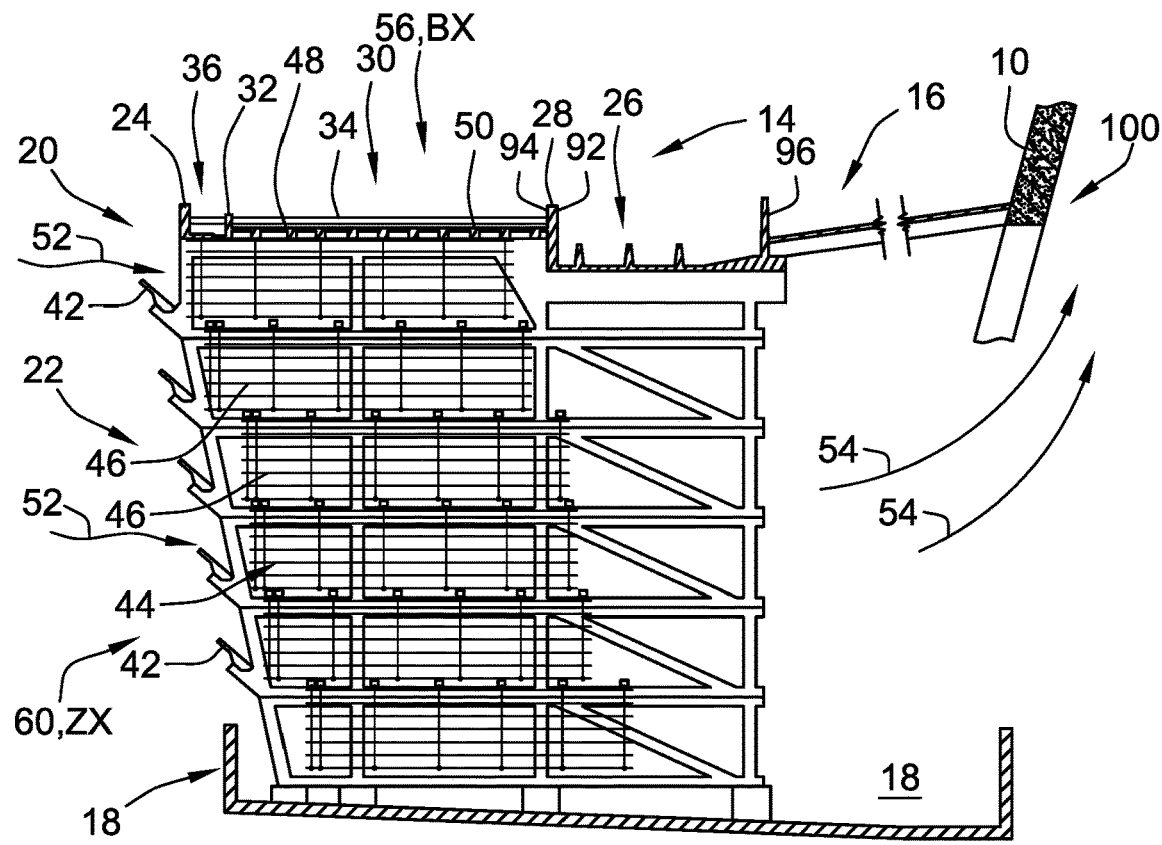
FIG. 3 is a schematic partial radial cross-sectional view of a cooling tower of the crossflow type shown in FIG. 1, showing a schematic cross-section view of section 3-3 of the cooling tower of FIG. 4, including the upper deck and fill structure.

As shown in FIGS. 1 and 3, the cooling tower 100 includes a cooling portion 20 and a hyperbolic shell 10. The cooling portion 20 is connected to the hyperbolic shell 10 by a canopy 16 which forms a portion of an upper deck 14 of the cooling portion 20 and encloses the evaporative fill structure 44 as shown in FIG. 3, such that incoming air 52 received through louvers 42 distributed along a peripheral face 22 of the cooling portion 20 is directed through the fill structure 44 to cool water travelling downward through the fill structure 44 from the distribution basin 30, and is contained within the canopy 16 prior to flowing along the exiting air path generally indicated at 54, to exit the hyperbolic shell 10 via an air outlet 12 (see FIG. 1). The upper deck 14 further includes the a generally annular flume 26 which is disposed between the canopy 16 and the hot water distribution basin 30. The flume 26 is separated from the canopy 16 by a generally annular canopy wall 96. The flume 26 is separated from the hot water distribution basin 30 by a generally annular flume wall 28 having a flume face 92 defining the flume 26, and a basin face 94 defining the distribution basin 30 (see FIGS. 21-23). The hot water distribution basin 30 may also be referred to herein as a distribution basin 30. An example cooling portion 20 of a cooling tower 100 is shown schematically in additional detail in cross-section in FIG. 3 and in a top view in FIG. 4.

Referring to FIGS. 1-4, when the cooling tower is in operation, hot water is received for cooling, for example, from a nuclear power plant, via a cooling tower inlet (not shown) and is directed into the flume 26. As shown in FIGS. 2-4, 10, 11 and 20, the flume 26 is separated from the distribution basin 30 by the flume wall 28. The flume wall 28 includes a plurality of notches 38 and a plurality of parapets 40 distributed along the circumference of the flume wall 28, such that each parapet 40 is separated from an adjacent parapet 40 by one of the notches 38. Hot water is received into the flume 26 and flows through the notches 38 into the distribution basin 30. The distribution basin 30 includes a basin floor 48 which can include a plurality of conduits 50, which may be configured, for example, as baffles and/or apertures, such that the water can flow and/or drain out from the distribution basin 30, through the conduits 50 in the basin floor 48, and be distributed through the fill structure 44 disposed below the basin floor 48. The distribution basin 30 further includes a basin wall 32 at the outermost periphery of the distribution basin 30.

Water flowing from the flume 26 into the distribution basin 30 via each of the plurality of notches 38 is retained in the distribution basin 30 by the flume wall 28 and the basin wall 32 until the water drains through the conduits 50 included in the basin floor 48 to be distributed across the fill members 46 in the fill structure 44. The fill members 46 are distributed within the fill structure 44, and are configured to splash, deflect and/or separate the water draining from the distribution basin 30 through the conduits 50 into droplets such that the water droplets, as they fall through the fill structure 44, are cooled by the air flowing in via the louvers 42, prior to being collected in a cold water collection basin 18 (see FIG. 3) for return to the power plant via an outlet (not shown). The fill members 46 can be configured as fill tubes, splash plates, fill bars, splash bars, or other configurations. The fill members 46 can be made of a polymer-based material, a metal-based material, or a combination of these.

Over time in use, the fill members 46 and fill structure 44 supporting the fill members 46 must be periodically maintained to maintain and/or recover the cooling efficiency of the cooling tower 100. For example, the fill members 46 can age, weather, crack or otherwise deteriorate resulting in decreased cooling effectiveness. Scale, slime, or other deposits can form on the fill members 46 and/or fill structure 44 which requires cleaning to maintain and/or recover cooling efficiency. The fill structure 44 includes concrete support members which in addition to the fill members 46 must be periodically inspected for conditions requiring cleaning, repair and/or replacement of these elements. Similarly, slime, scale, and algae growth can accumulate in the distribution basin 30, on de-icing pipes 34 located in the distribution basin 30, and/or in the conduits 50 in the basin floor 48 requiring that these structures be periodically inspected, cleaned and/or repaired to maintain and/or recover the cooling efficiency of the cooling tower 100.

As described previously herein, such inspection and maintenance typically has historically been conducted only when the cooling tower 100 can be fully shut down and the water drained from the cooling portion 20 including the distribution basin 30, to allow access to the surfaces and elements of the cooling portion which require inspection, descaling, cleaning, repair, etc. Full shut down of the cooling tower 100 has historically and/or typically been limited to those occurrences when the associated nuclear power plant is shut down in a cold outage, such that the power plant does not require the cooling tower 100 to cooling and recycle the water used by the nuclear power plant, for example, to cool the nuclear reactor. Nuclear power plants are most efficient when run continuously, therefore planned cold outages are typically limited to those cold outages which cannot be avoided. For example, planned cold outages of a nuclear power plant typically occur at 18 month to 24 month intervals, for fuel replenishment in the nuclear reactor. As discussed previously, providing a system such as the water diversion system 70 described herein, where water can be selectively and temporarily diverted from dammed sections 68 of the distribution basin 30 without reducing the cooling performance of the cooling tower 100 during the water diversion event, allows maintenance personnel and equipment access into the dammed sections 68 from which the water has been diverted, to perform inspections and maintenance of the distribution basin 30, the basin floor 48 and conduits 50, the de-icing pipes 34, the fill members 46 and the fill structure 44 within the dammed sections 68 at more frequent intervals, e.g., at intervals less than 18 months, and on a schedule which is independent of power plant cold outage planning, and without the delay of waiting for a planned shutdown of the cooling tower or power plant. Further, inspection and maintenance can occur on a predetermined schedule such that sections of the cooling tower 100 can be inspected sequentially and/or repeatedly within the time period between planned power plant cold outages.

Figure 2:
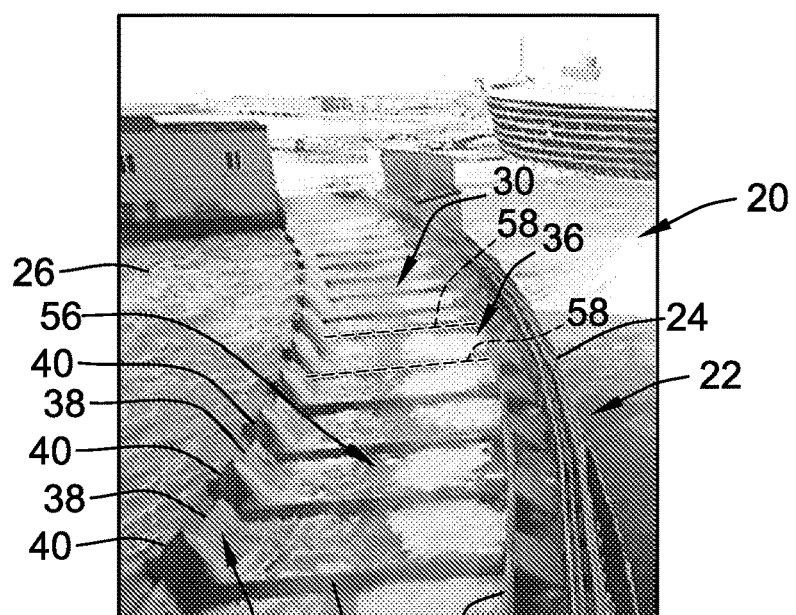
FIG. 2 is a photographic image of a perspective top view of an upper deck of the cooling tower of FIG. 1, showing area 2-2 of FIG. 1, and including a flume and a hot water distribution basin.
Figure 4:
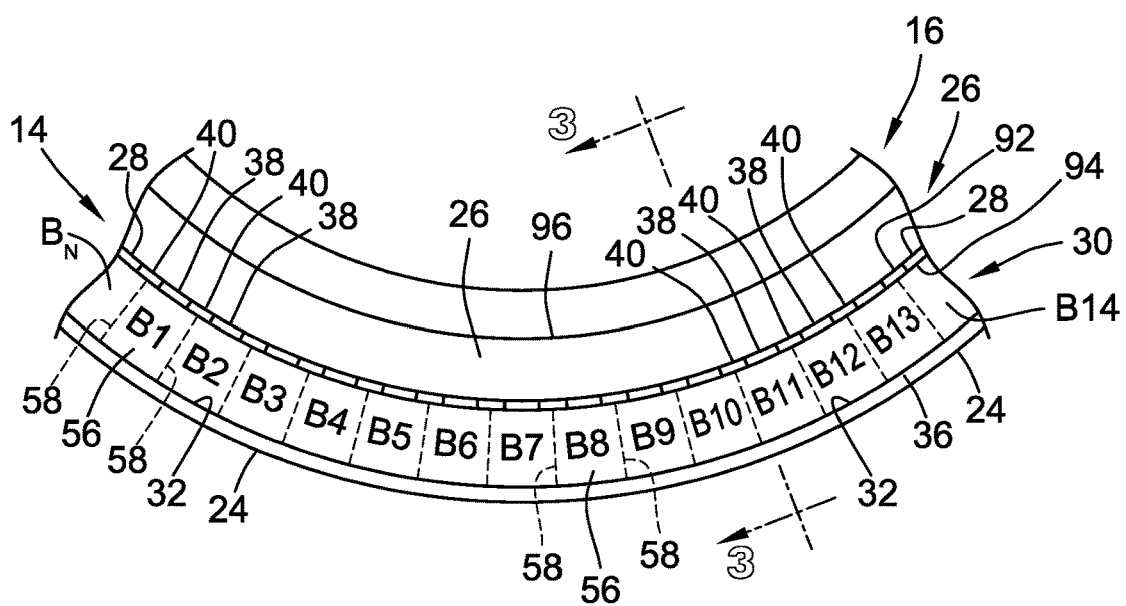
FIG. 4 is a schematic partial top view of an upper deck of the cooling tower of FIG. 3.
Figure 5:
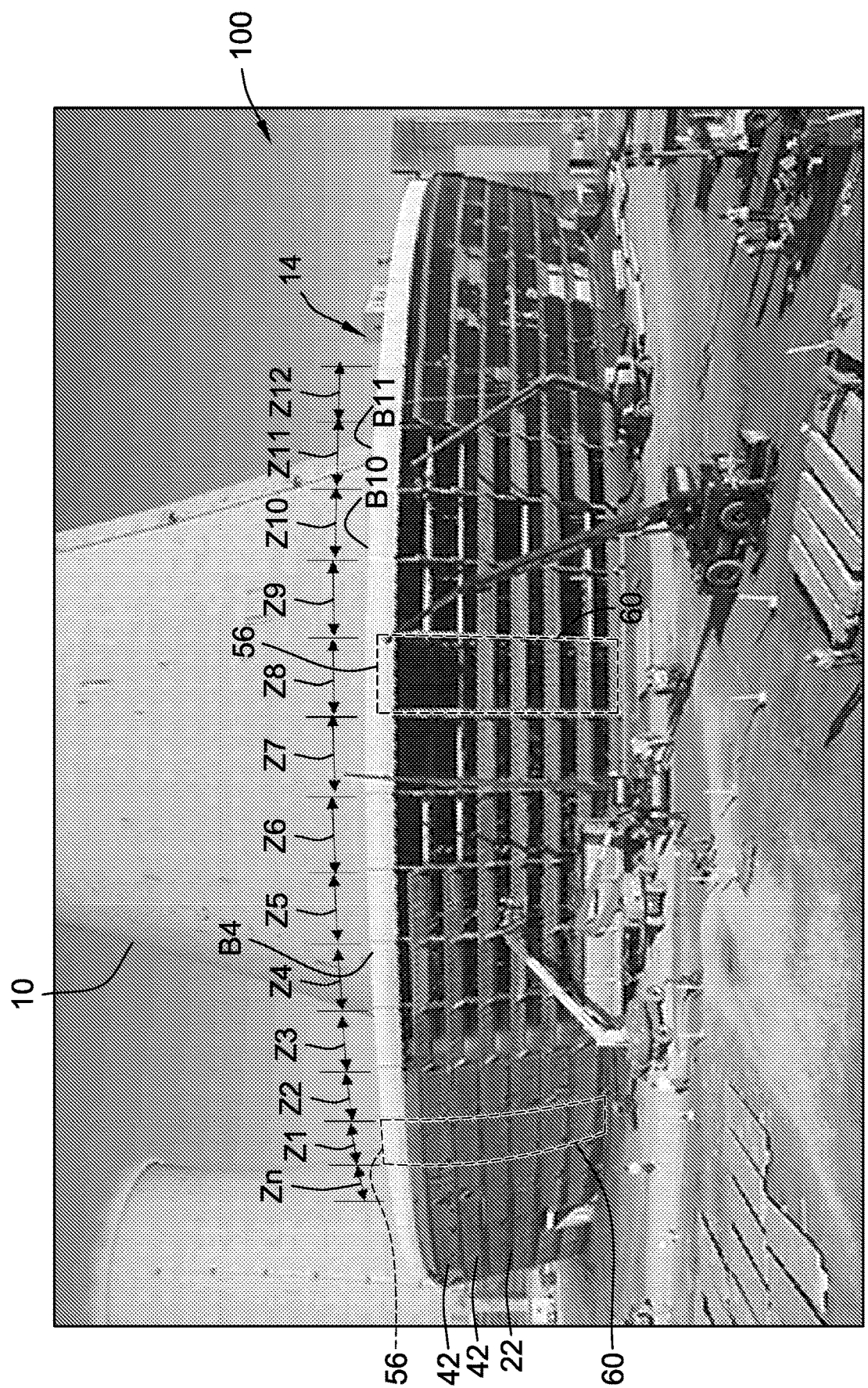
FIG. 5 is a photographic image of a perspective side view of the cooling tower of FIG. 1 showing louvers removed from a plurality of bays in a dammed section of the distribution basin, from which water has been diverted using the water diversion system described herein and shown in FIGS. 8-19.
Figure 6:
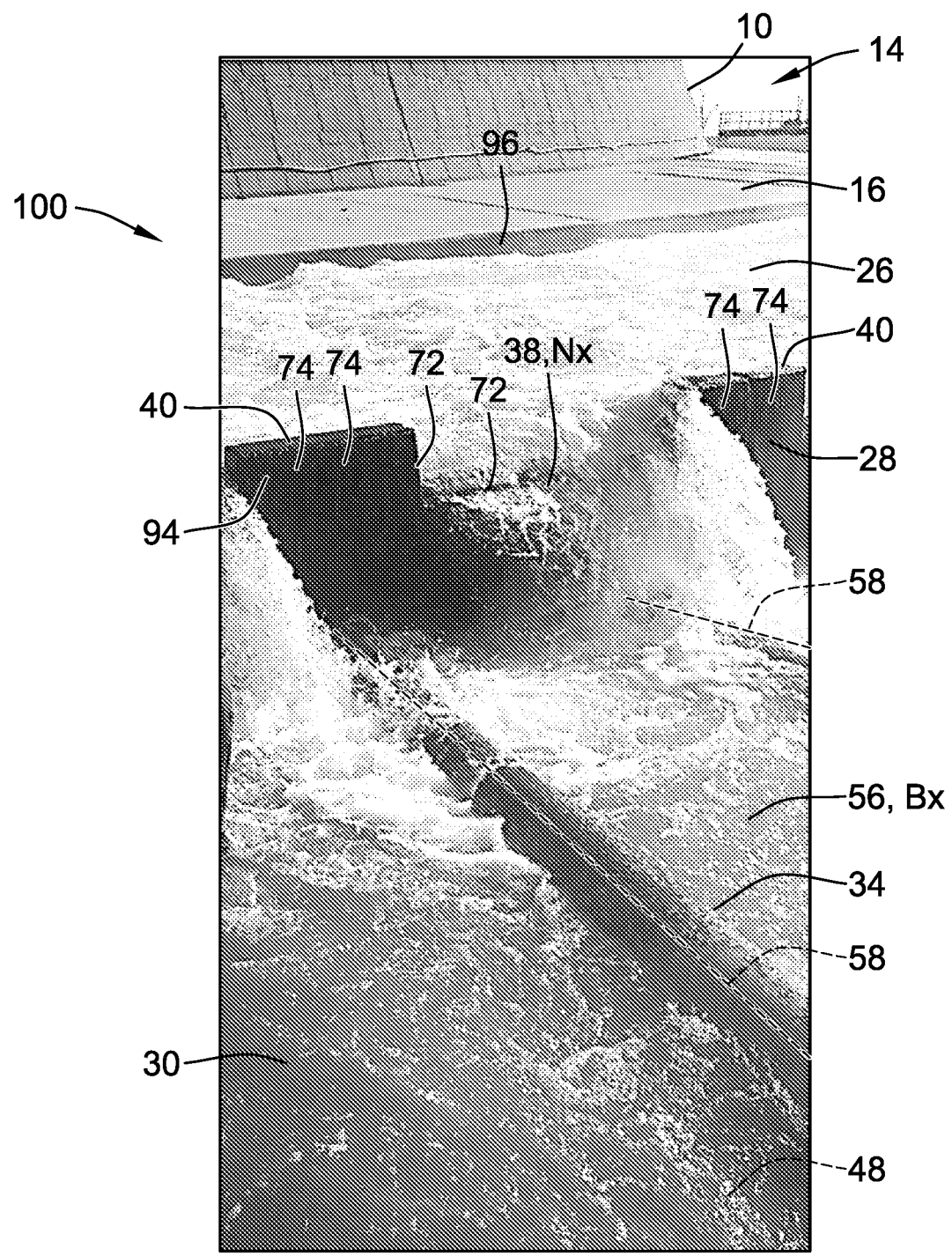
FIG. 6 is a photographic image of a perspective top view of the upper deck of the cooling tower of FIG. 1, including the hot water distribution basin, the flume, and the flume wall including a plurality of parapets separated by notches such that water is flowable from the flume into the distribution basin via the notches, and further including a de-icing pipe extending radially from the flume wall.

As shown in FIGS. 2, 4-6, and 10-11, the cooling portion 20 can be divided into a plurality of wedge shaped cooling zones 60, as best shown in FIG. 5, defined by adjacent radial borders 58 as best shown in FIGS. 4, 6, 10, 11 and 20, each zone identified for illustration in sequential clockwise order as Z1, Z2, Z3 . . . through Zn, where n represents the total number of zones 60 in the cooling portion 20. In the example shown, the cooling portion 20 is divided into eighty-four (84) wedge shaped cooling zones 60. As shown in FIGS. 2 and 4, the distribution basin 30 is similarly subdivided into bays 56, identified in sequential clockwise order as B1, B2, B3 . . . through Bn, with each of the cooling zones 60 including a bay 56 such that cooling zone Z3 includes bay B3, and so on. In the example shown, each of the radial borders 58 extends from a parapet 40, such that each bay 56 receives water from the flume 26 through a corresponding notch 38 in the flume wall 28 within the bay 56, as shown in FIG. 6 for example, where water flows into bay 56 (Bx) via the notch 38 (Nx) located in the bay 56 (Bx). In the illustrative example, the distribution basin 30 further includes a plurality of de-icing pipes 34, such that each bay 56 is separated from an adjacent bay 56 by a de-icing pipe 34 extending from a parapet 40 along a radial border 58 of the bay 56 to the basin wall 32, and further extending through the basin wall 32 and peripheral trough 36 to the peripheral wall 24 of the cooling portion 20, such that the positioning of each of the de-icing pipes 34 coincides with one of the bay borders 58. The purpose of the de-icing pipes 34 is to selectively, for example, in periods of freezing weather, convey uncooled water to the exterior periphery of the cooling portion 20, and to discharge the uncooled water into the peripheral trough 36 and/or at or onto the peripheral wall 24 to minimize and/or prevent ice formation within the cooling portion 20 and within the cold water collection basin 18 of the cooling tower 100 during the period of freezing weather. These de-icing pipes 34 also require periodic inspection and maintenance, which can include cleaning and descaling the pipes 34 and/or inspecting the pipes 34 for bypass leakage, etc. By diverting the water from a dammed section 68 of the distribution basin 30 using the water diversion system 70 described herein, the de-icing pipes 34 located in the dammed section 68 are made available to and accessible by maintenance personnel for inspection, maintenance and repair. During a water diversion event, the water supply to the de-icing pipes 34 in the dammed section 68 is turned off using valving available for that purpose, such that water diversion from the dammed section 68 includes diverting water from the de-icing pipes 34 as well as the distribution basin 30, as indicated at step 220 of the method 200 shown in FIG. 12.

Referring to FIG. 5, shown is an example the cooling tower 100 with the water diversion system 70 installed and operating to divert water from a dammed section 68 including a plurality of dammed cooling zones 60 identified in FIG. 5 as Z3 through Z11. While the water is being diverted from the dammed cooling zones Z3 through Z11, and while maintenance tasks are being performed in cooling zones Z3 through Z11, the cooling tower 100 continues to function with the remaining undammed zones Z1, Z2 and Z12 through Zn cooling the water received from the power plant. As observed in experimental trials using the water diversion system 70, a plurality of cooling zones 60 can be dammed without reducing the cooling performance of the cooling tower 100, e.g., during the experimental trials, the remaining undammed cooling zones 60 provided sufficient cooling capacity such that the cooling performance of the cooling tower was maintained at performance levels observed prior to selectively damming a plurality of the cooling zones. Maintenance tasks performed in the dammed cooling zones 60 can include, by way of non-limiting example, maintenance activities performed in the dammed section 68 of the distribution basin 30 on the upper deck 14, and maintenance activities performed in the cooling zones Z3 through Z11 in the areas under the upper deck 14, including, for example, removal and inspection of louvers 42 from the peripheral face 22 of the cooling portion, inspection, maintenance, cleaning, repair and replacement of fill tubes 46 in the fill structure 44 (see FIG. 3), and/or of the fill structure 44 including concrete replacement and/or repair.

Figure 7:
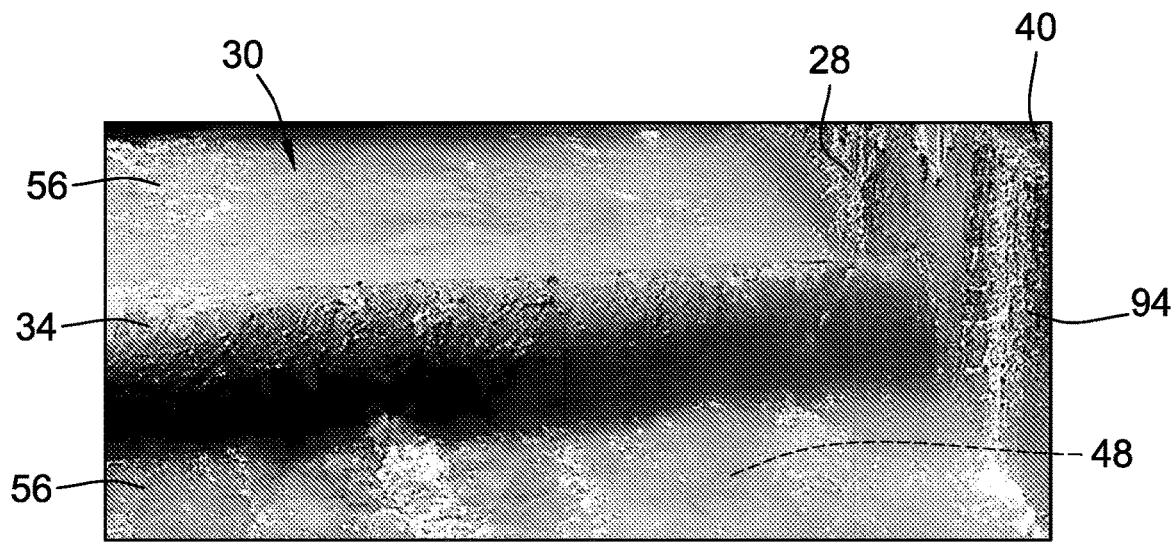
FIG. 7 is a photographic image of a perspective side view of a de-icing pipe extending from the flume wall and illustrating scale, slime and algae deposits on the pipe surface and the flume wall to be cleaned from the pipe and flume wall after the water is diverted from the area using the water diversion system shown in FIGS. 8-19.
Figure 8:
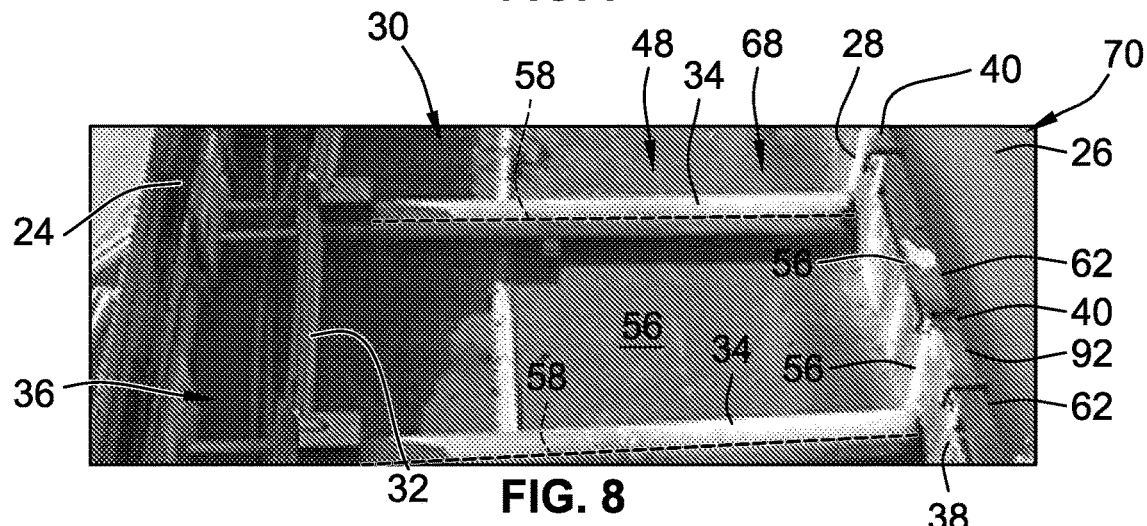
FIG. 8 is a photographic image of a perspective top view of a bay within a dammed section, showing flume dams installed into notches in the flume wall, showing de-icing pipes after cleaning, and showing the basin floor prior to descaling and cleaning.
Figure 9:
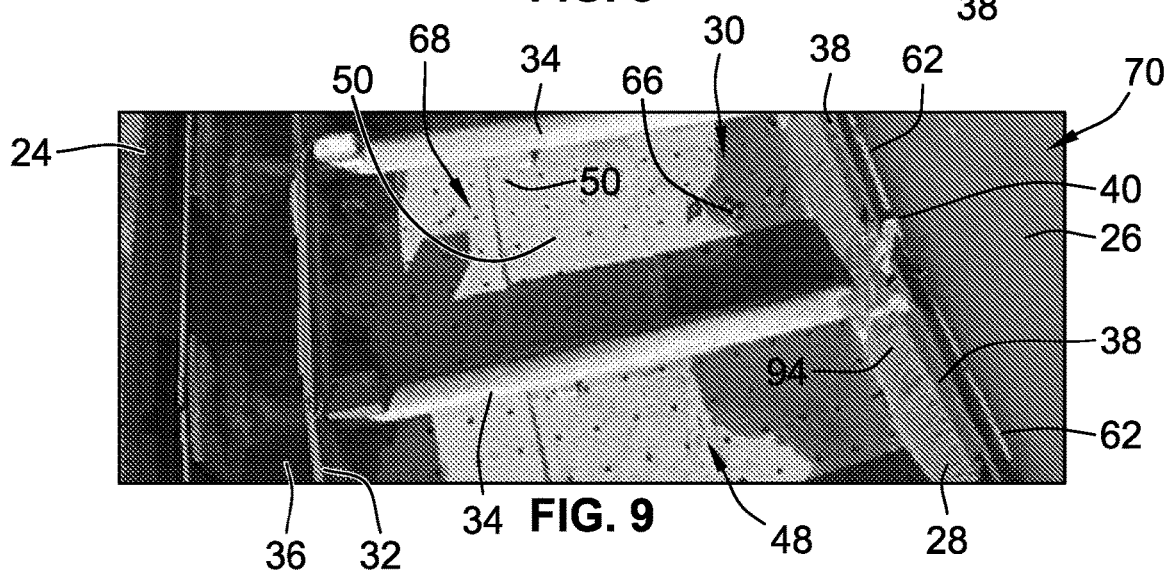
FIG. 9 is a photographic image of a perspective top view of adjacent bays within a dammed section, showing flume dams installed into notches in the flume wall, showing de-icing pipes after cleaning, and showing the basin floor after descaling and cleaning the basin floor and basin baffles and/or apertures located in the basin floor.
Figure 20:
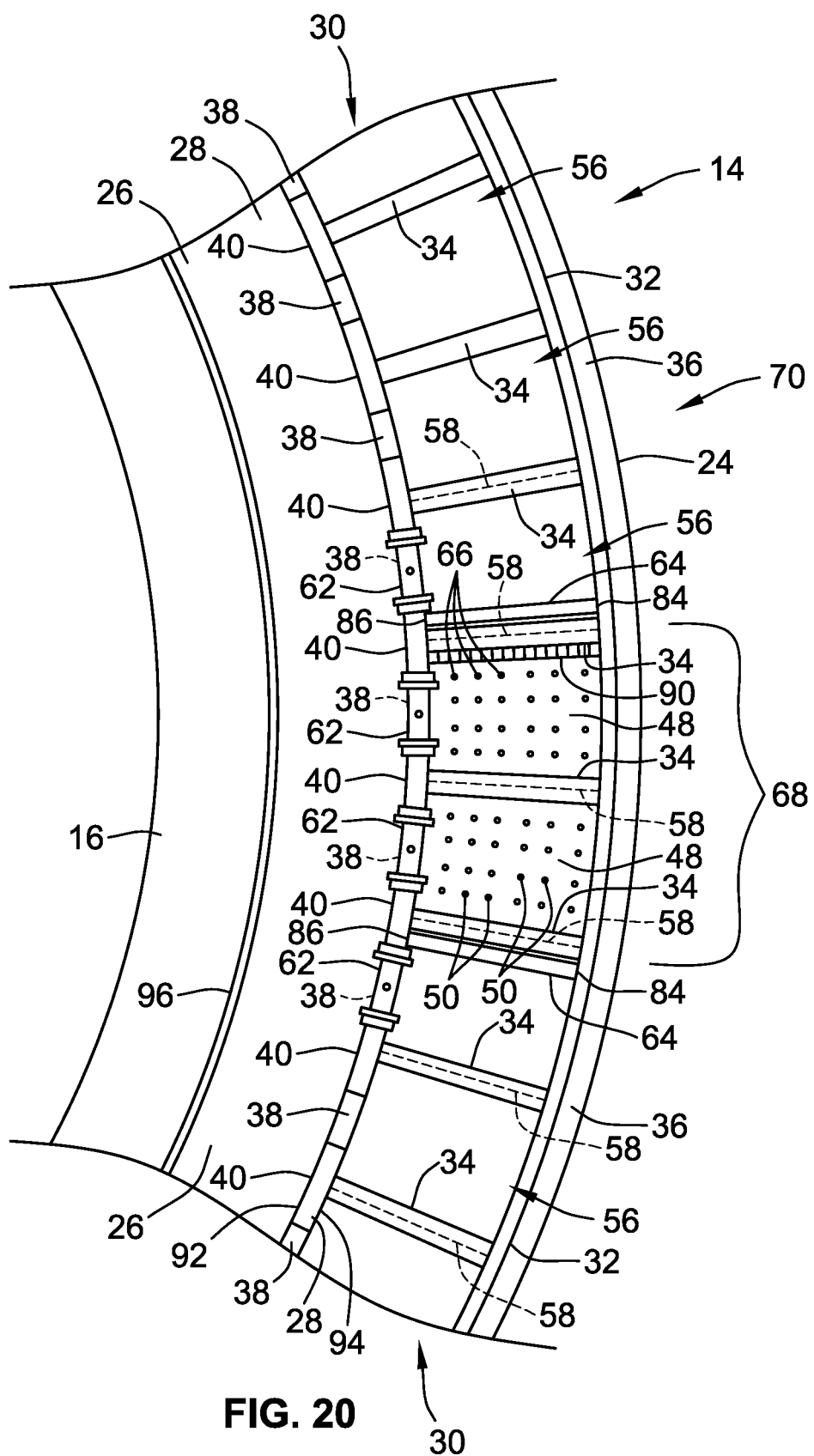
FIG. 20 is a schematic partial top view of the upper deck of the cooling tower of FIG. 3 showing a dammed section including two dammed bays having basin dams installed at each end of the dammed section and an auxiliary basin dam at one end of the dammed section, and further showing flume dams installed in the notches included in and immediately adjacent to the dammed section, according to a method for diverting water from the dammed section as further described herein.

FIGS. 6-9 show a sequence of conditions in the distribution basin 30 during a water diversion event, illustrating the advantages of using the water diversion system 70 to continuously maintain sections of the cooling portion 20. Shown in FIG. 6 is a bay 56 in an undammed condition, where water is flowing into the bay 56 from the flume 26 via the notch 38 positioned in the bay. In the undammed condition shown in FIG. 6, none of the de-icing pipes 34, the basin floor 48 of the bay 56, the conduits 50 in the basin floor 48, the basin face 94 and the notch surfaces 72 of the notch 38 are accessible for maintenance when water is flowing into the bay 56 via the notch 38 and along the basin floor 48. FIG. 7 show adjacent bays 56 and a de-icing pipe 34 therebetween, where the adjacent bays 56 have been dammed using the water diversion system 70 and the method 200 shown in FIG. 12, such that, as the water level decreases in the dammed section 68 during the water diversion event, for example, by pumping the water from the dammed section 68 into an adjacent undammed section 98, or draining the remaining water from the dammed section 68 via the conduits 50 in the basin floor 48, the basin face 94 of the flume wall 28 and the de-icing pipes 34 within the dammed section 68 are exposed and made available for inspection and cleaning including descaling and/or desliming. FIG. 8 shows the dammed section 68 after the remaining water has been drained or otherwise removed from the dammed section 68, and further shows the basin face 94 of the flume wall 28, the basin wall 32, and the de-icing pipes 34 after inspecting and cleaning. The basin floor 48 and the conduits 50 in the dammed section 68, now drained, are accessible for inspection and cleaning, which can include cleaning scale and other contaminants from the basin floor 48 and/or the conduits 50. Scale and other contaminant build-up in the conduits 50 reduce the effective cross-sectional area of the conduits 50 thus reducing the flow rate of water passing through the conduits 50 and being distributed for cooling in the fill structure 44. FIG. 9 shows the dammed section 68 after cleaning the basin floor 48 and the conduits 50, likely yielding increases in water flow rate through the conduits 50 and improvements in cooling effectiveness of the cooling tower 100. As shown in FIGS. 9, 20 and 21, the conduits 50 may be temporarily sealed by plugs 66 to block any water collecting in the dammed section 68, for example, from rainfall or otherwise, from draining through the conduits 50 into the cooling zones 60 below the bays 56 of the dammed section 68 while maintenance is being performed in the cooling zones 60, to prevent water draining from the dammed section from falling onto maintenance workers and/or equipment being used to perform maintenance activities in the cooling zones 60 during the diversion event. A pumping device (not shown) may be situated in the dammed section 68 during the diversion event, to pump residual water, incidental water accumulation, etc., from the dammed section 68 into an adjacent undammed section 98 and/or into the flume 26, to maintain the dry condition of the dammed section 68.

As described in further detail herein, the water diversion system 70 includes a one or more flume dams 62 installed to one or more notches 38, to block the flow of water from the flume 26 into the distribution basin 30 via the notches 38 dammed by the flume dams 62, as shown in FIGS. 8-11, and FIGS. 14-23. The water diversion system 70 further includes a plurality of basin dams 64 as shown in FIG. 11 and FIG. 16-21 for blocking the flow of water into the dammed section 68 of the distribution basin 30 from adjacent undammed sections 98 of the distribution basin 30. As shown in the figures, each notch 38 is defined by notch surfaces 72 of the flume wall 28. In the dammed section 68, a flume dam 62 is installed to each of the notches 38 in the dammed section 68, such that, with the flume dam 62 in an installed position, sealing contact is made by the flume dam 62 with the flume face 92 of the flume wall 28 around the perimeter of the notch 38, as shown in FIGS. 14-15 and 21-23. As shown in FIGS. 8-9, 14-15 and in additional detail in FIGS. 21 and 22, the flume dam 62 is mounted to adjacent parapets 40, such that one end of the flume dam 62 is in contact with and/or substantially conforms to parapet surfaces 74 of a first parapet 40 and the other end of the flume dam 62 is in contact with and/or substantially conforms to parapet surfaces 74 of a second parapet 40, such that in the installed position, the flume dam 62 blocks the flow of water from the flume 26 into the distribution basin 30 via the notch 38 defined between the first and second parapets 40.

In non-limiting examples shown in the figures, the flume dam 62 includes a dam plate 88 for contacting the flume face 92 of the flume wall 28, to block the notch 38 when the flume dam 62 is in the installed position, e.g., installed to the notch 38. The dam plate 88 can include one or more flanged or bent sections for increasing the strength, rigidity, and/or stability of the dam plate 88 and/or for conforming the dam plate 88 to the parapet surfaces 74 and/or to the flume face 92, such that the dam plate 88 can be installed in sealing contact with the flume wall 28. The flume dam 62 can include one or more brackets 76 which can be configured and/or positioned for increasing the strength, rigidity, and/or stability of the flume dam 62 and/or to conform with and/or contact the parapet surface 74 to provide a sealing contact of dam plate 88 to the flume face 92 around the perimeter of the notch 38. In one example, the bracket 76 can include a flange for strength and/or rigidity, and or be configured of angle stock. The bracket 76 can be configured, as shown in FIGS. 14-15, 21 and 22 for receiving a fastener 78, where the fastener 78 in an installed position attaches and/or retains the flume dam 62 to the flume wall 28. In one example, the fastener 78 and/or bracket 76 are configured such that, in an installed position the fastener 78 and/or the bracket 76 compresses the dam plate 88 against the flume face 92 of the flume wall 28, to increase sealing conformance of the dam plate 88 to the flume face 92. In one example, the flume dam 62 includes a sealing element 82 where in the installed position, the sealing element 82 is disposed between the dam plate 88 and the flume face 92, as shown in FIGS. 22 and 23. In one example, the sealing element 82 can be configured as a gasket lip seal, compressible sealing material, or other sealing element 82 to seal the dam plate 88 to the flume face 92. The gasket 82 can be compressed by the bracket 76 and/or the fastener 78 against the flume face 92, to increase conformance of the gasket 82 to the flume face 92.

The flume dam 62 can include a lifting member 80, which can be configured, by way of example, as a handle, an eye ring, a bracket, or other lifting member 80 to assist in moving, positioning and adjusting the flume dam 62 during installation, and to assist in transporting the flume dam 62 to and from the upper deck 14 of the cooling portion 20, for example, using a crane or other lifting device.

The basin dam 64 is shown in FIGS. 16-19. A basin dam 64 is positioned at each end of the dammed section 68 to retain water from flowing into the dammed section 68 from the remainder of the distribution basin 30. In one example, the basin dam 64 can include a dam plate 88 configured as a flanged sheet which is positioned to abut the de-icing pipe 34, such that the pressure exerted by the water load of the water in the basin dam 64 acts against the flanged sheet of the basin dam 64 to seal the basin dam 64 against the abutting de-icing pipe 34 and basin floor 48 as shown in FIGS. 18-21. The dam plate 88 can include one or more flanged or bent sections for increasing the strength, rigidity, and/or stability of the dam plate 88 and/or for conforming the dam plate 88 to the flume and basin walls 28, 32, and/or to the basin floor 48, such that the dam plate 88 can be installed in sealing contact with the flume and basin walls 28, 32, and with the basin floor 48. The basin dam 64 can include one or more brackets 76 which can be configured and/or positioned for increasing the strength, rigidity, and/or stability of the basin dam 64 and/or to conform with and/or contact the flume and basin walls 28, 32, and/or to the basin floor 48 to provide a sealing contact of dam plate 88 to the flume and basin walls 28, 32, and with the basin floor 48. In one example, the bracket 76 can include a flanged portion for strength and/or rigidity, and/or can be made of angle stock. In one example, the basin dam 64 can be adjustable in length, such that during installation, the length of the basin dam 64 can be adjusted for variations in the radial distance from the flume wall 28 to the basin wall 32. By way of illustrative example, the dam plate 88 can include at least two plate components arranged such that one of the plate components is moveable relative to the other plate component to extend or contract the overall length of the dam plate 88 as required to seal the dam ends 84, 86 respectively to the flume and basin walls 28, 32. In another example, at least one or both of the dam ends 84, 86 and/or at least one of the brackets can be configured such that they are adjustable relative to the dam plate 88 and/or relative to the brackets 76, to extend or contract the overall length of the dam plate 88 as required to seal the basin dam 64 to the flume and basin walls 28, 32. The examples described herein are non-limiting, and other configurations and combinations of the components can be used to provide a basin dam 64 which is adjustable in length, including configuring one or more of dam plate 88, ends 84, 86, and brackets 76 such that at least one of them is slidable, telescoping, hinged, foldable, or otherwise moveable relative to another such that the overall length of the basin dam 64 can be extended and/or contracted, e.g., such that the overall length of the basin dam 64 is adjustable. The bracket 76 can be configured for receiving a fastener 78, where the fastener 78 in an installed position attaches and/or retains the basin dam 64 to one or more of the flume and basin walls 28, 32, and/or to the basin floor 48. In one example, the fastener 78 and/or bracket 76 are configured such that, in an installed position the fastener 78 and/or the bracket 76 compresses the dam plate 88 against one or more of the basin floor 48, the flume wall 28, and the basin wall 32, and/or to, to increase sealing conformance of the dam plate 88 to the basin floor 48, the flume wall 28, and/or the basin wall 32. In one example, the basin dam 64 includes a sealing element 82 where in the installed position, the sealing element 82 is disposed between the dam plate 88 and the basin floor 48, as shown in FIG. 21. The basin dam 64 can include one or more sealing elements 82 for sealing ends 84, 86 of the basin dam 64 to the flume and basin walls 28, 32. In one example, the sealing elements 82 are removable from the sealing ends 84, 86 and available in varying thicknesses, such that a sealing element 82 of the required thickness to effect a seal to the respective flume and basin wall 28, 32 can be selected and attached to the respective sealing end 84, 86 prior to or during installation of the basin dam 64 to the distribution basin 30. In one example, the sealing element 82 can be configured as a gasket lip seal, compressible sealing material, a boot gasket, a locking gasket, or other sealing element 82 to seal the dam plate 88 to the basin floor 48, the flume wall 28, and/or the basin wall 32. The gasket 82 can be compressed by one or more of the dam plate 88, the bracket 76 and/or the fastener 78 against the basin floor 48, the flume wall 28, and/or the basin wall 32, to increase conformance of the gasket 82 to the basin floor 48, the flume wall 28, and/or the basin wall 32.

Each of the dam plates 88, the dam brackets 76, the flume dams 62 and the basin dams 64 can be made of any material of suitable strength, rigidity, and durability to withstand the water loads and providing the damming function described herein for the water diversion system 70. By way of non-limiting example, each of the flume dam 62 and basin dam 64 can be made of a metal-based material, such as aluminum, steel, iron, or the like, a polymer-based material which may be a reinforced or high strength polymer, and/or a composite material such as a laminated metal composite, a rubber-metal composite, a polymer-metal composite, etc. The basin dams 64, the flume dams 62, the conduit plugs 66, and/or components thereof can be partially or fully coated, plated, painted, or otherwise surface treated for corrosion resistance and/or to provide a surface condition which improves the conformance of the component to a surface sealed and/or blocked by the component. By way of non-limiting example, the dam plate 88 may be treated with a polymer or rubber coating on the surfaces which conform to the flume face 92 and/or the basin floor 48, and may be painted in the remaining surfaces for corrosion resistance.

As shown in FIGS. 16-21, an auxiliary basin dam 90 can be included as part of or supplemental to the basin dam 64. In an illustrative example, in an installed position the auxiliary basin dam 90 extends radially from the flume wall 28 to the basin wall 32, and is positioned within the dammed section 68 adjacent one or both of the basin dams 64, to block water from flowing into the working area of the dammed section 68 and/or to provide a redundant or secondary dam structure in the event of water flow over the adjacent basin dam 64. In one example, the auxiliary basin dam 90 can be formed of a plurality of portable dam sections, such as sand bags or the like, which may be arranged and/or interlocked to form the auxiliary basin dam 90. In another example, the auxiliary basin dam 90 can be configured as a basin dam 64, which can be positioned within the distribution basin 30, for example, using one or more fasteners 78.

Figure 10:
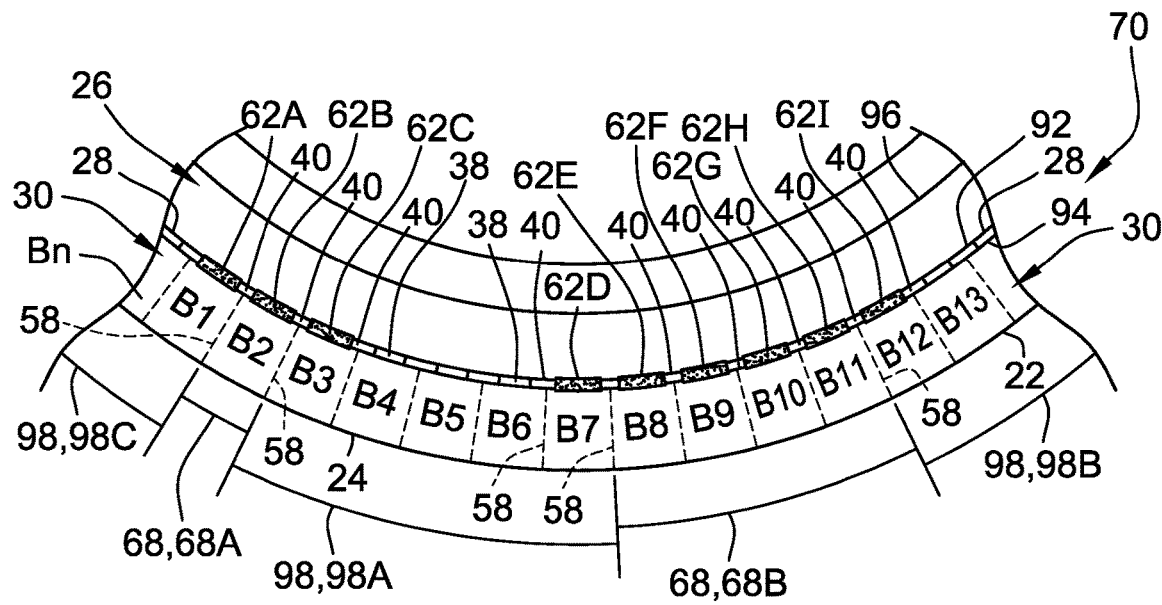
FIG. 10 is a schematic partial top view of the upper deck of the cooling tower of FIG. 3 showing two sections identified for damming and further showing flume dams installed in the notches included in and immediately adjacent to each of the two sections to be dammed, according to a method for diverting water from the dammed sections as further described herein.
Figure 11:
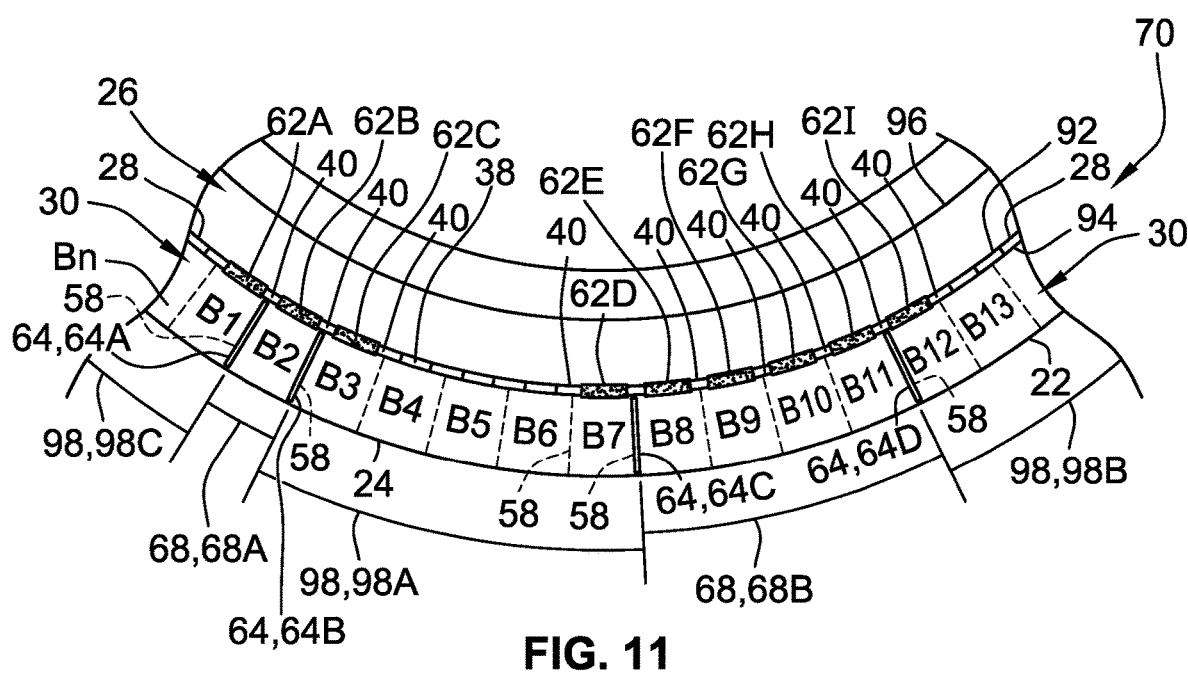
FIG. 11 is a schematic partial top view of the upper deck of the cooling tower of FIG. 4, showing basin dams installed at the first and second ends of each of the dammed sections.
Figure 12:
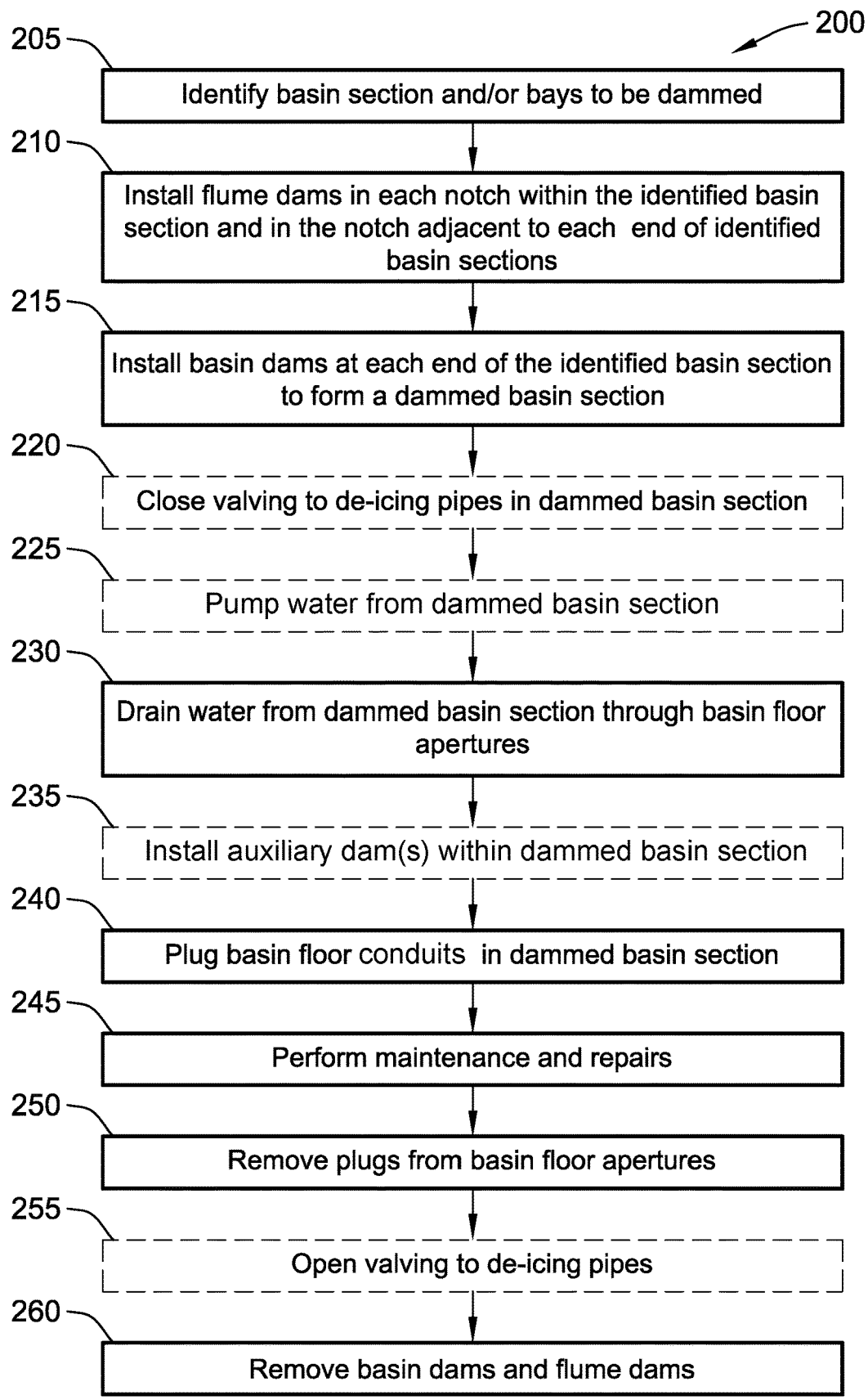
FIG. 12 is a flowchart illustrating an example method for diverting water from an identified section of the distribution basin using the water diversion system described herein.
Figure 13:
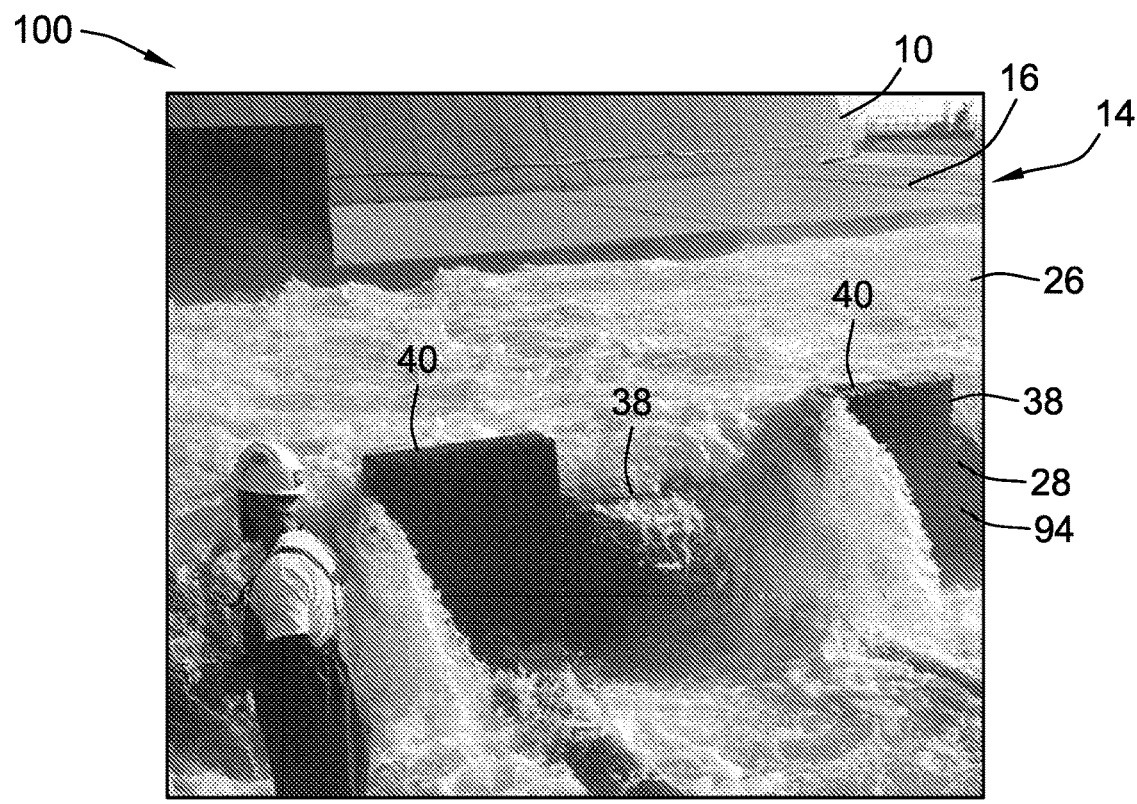
FIG. 13 is a photographic image of a perspective side view of a section of the flume wall separating the flume and the distribution basin.
Figure 14:
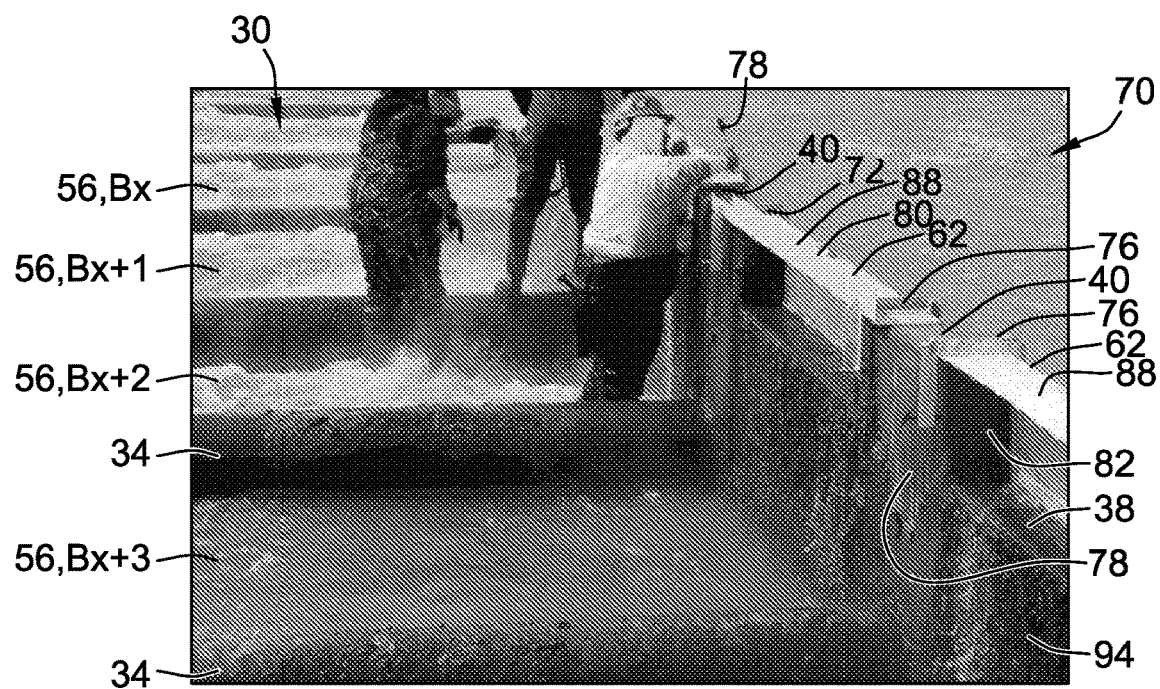
FIG. 14 is a photographic image of a perspective side view showing installation of flume dams into notches in a section of the distribution basin being dammed.
Figure 15:
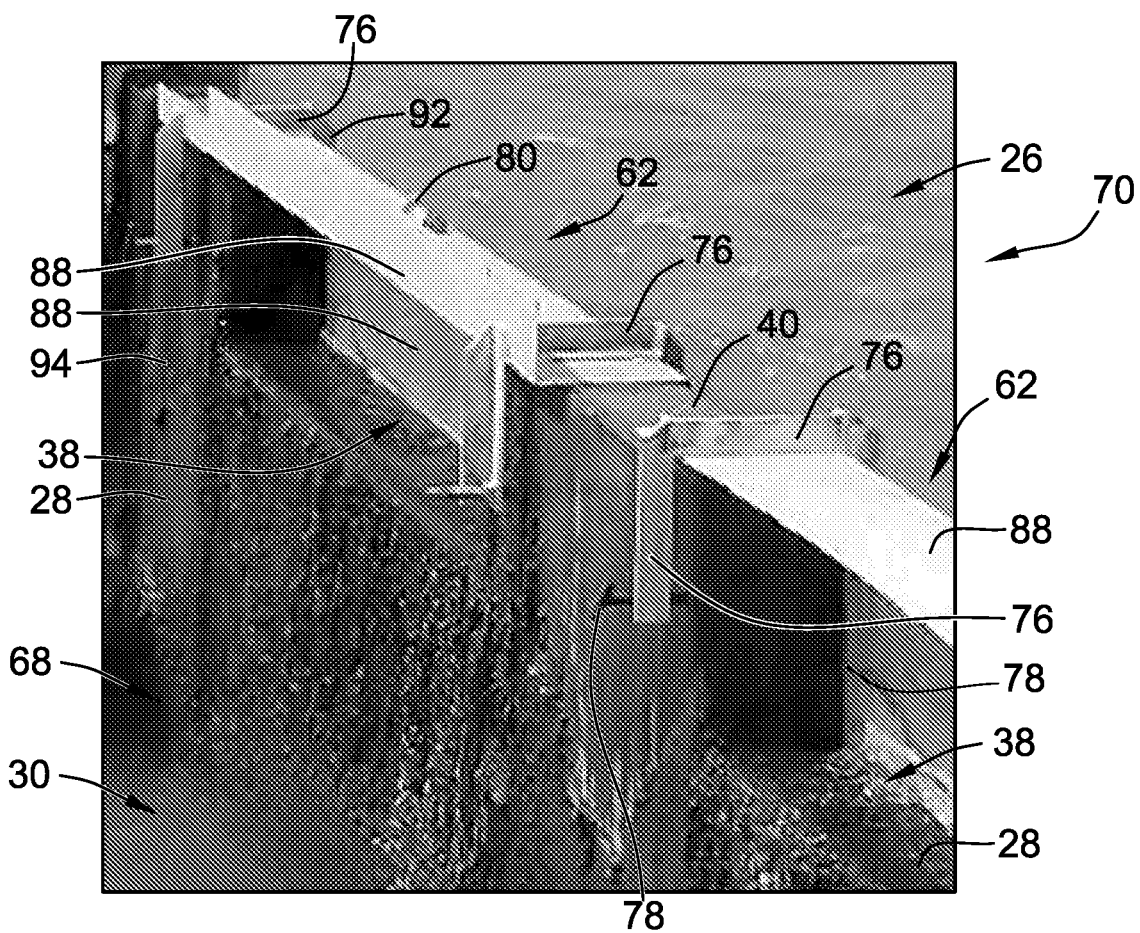
FIG. 15 is a partial view of the photographic image of FIG. 14 showing flume dams in an installed position attached to the parapets of the flume wall
Figure 16:
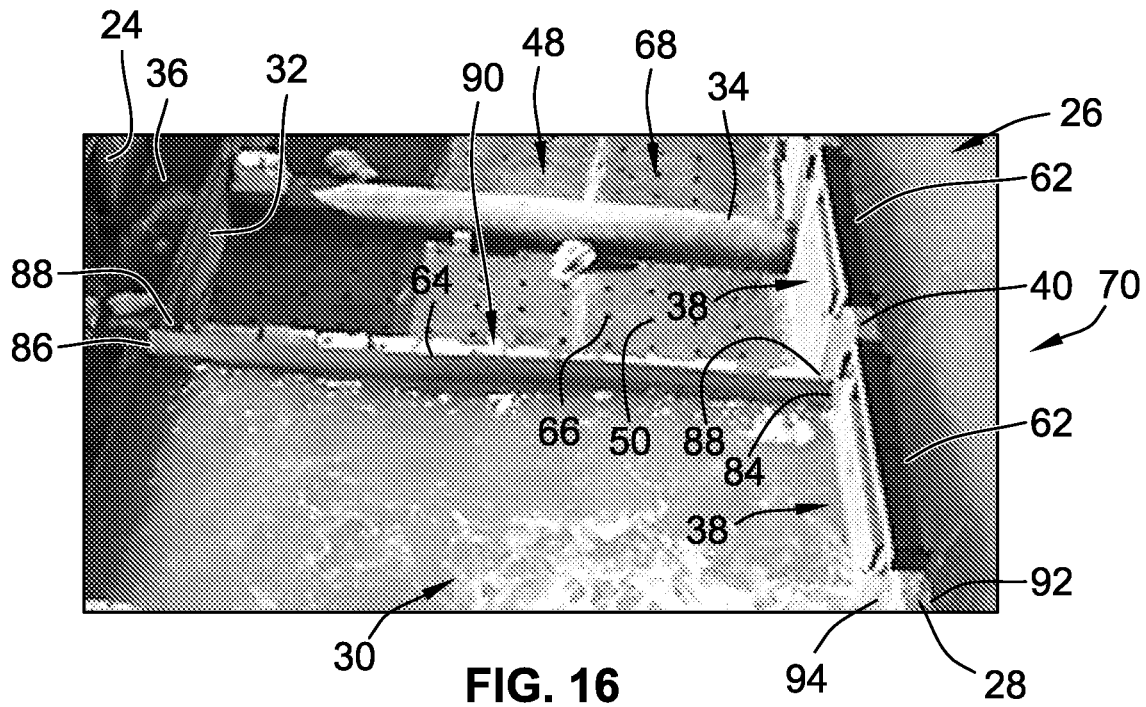
FIG. 16 is a photographic image of a perspective top view of the water diversion system in an installed position, including a plurality of flume dams and showing one of two basin dams.
Figure 17:
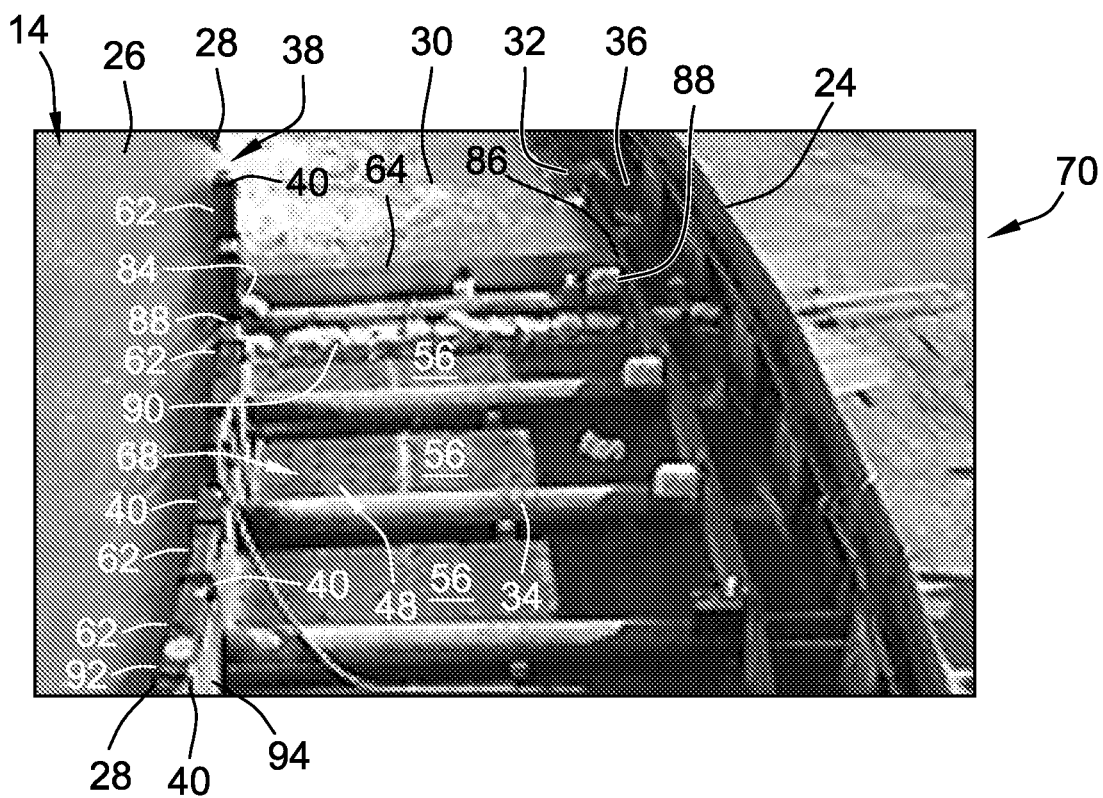
FIG. 17 is a photographic image of a perspective top view of a dammed section showing the water division system in an installed position, including a plurality of flume dams and basin dams, viewing the dammed section from the dry side of a first one of two basin dams.
Figure 18:
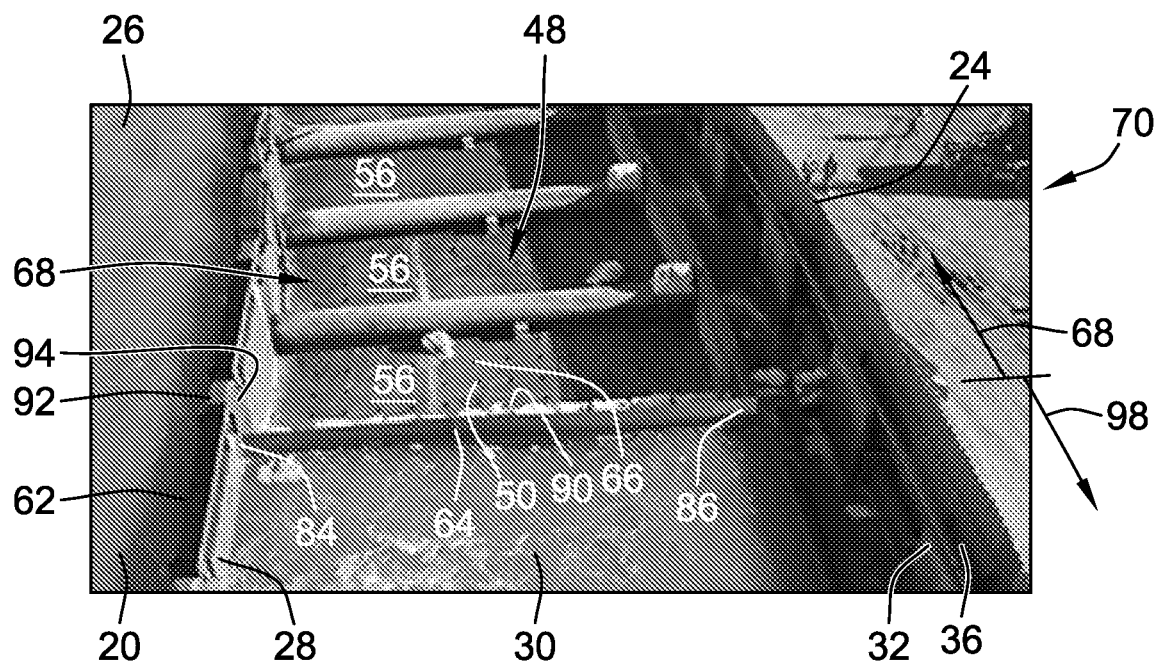
FIG. 18 is a photographic image of a perspective top view of the dammed section of FIG. 17, viewing the dammed section from the wet side of a second one of two basin dams.
Figure 19:
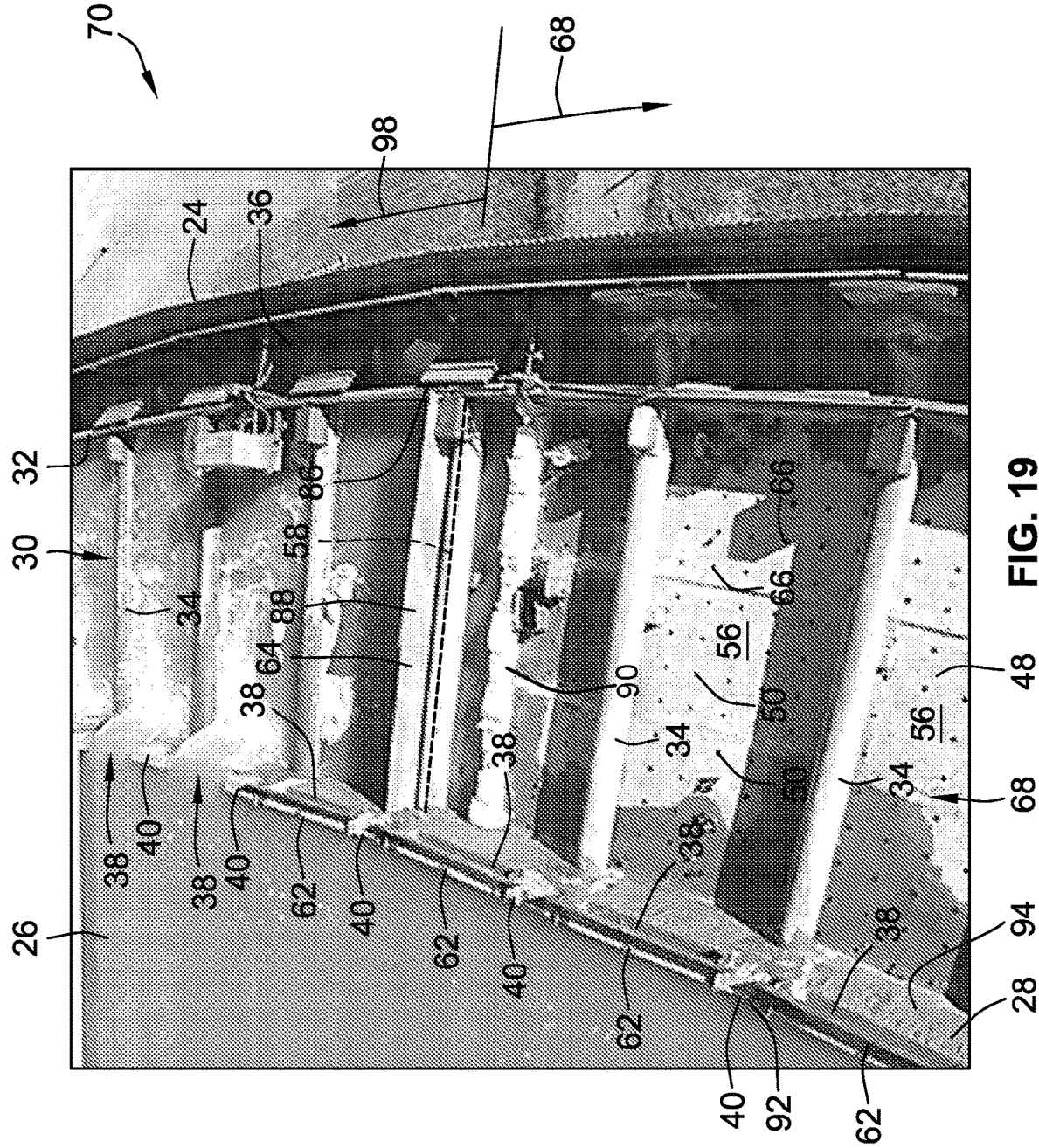
FIG. 19 is a photographic image of a perspective top view of a portion of a dammed section as shown schematically in FIG. 11.

A method 200 of deploying the water diversion system 70 is illustrated in FIG. 12. As shown in FIG. 12, the method begins at 205 with identifying the basin section and/or bays 56 to be dammed, e.g., from which water will be diverted. The number of bays 56 included in the dammed section 68 can vary depending on maintenance needs, workforce, supply and equipment availability, working conditions including weather or other environmental conditions, and operating conditions and performance demands on the cooling tower 100. For example, increases in ambient temperature may limit the maximum number of bays 56 which can be included in a dammed section 68 and/or a diversion event, due to potential temporary impact on cooling capacity of the cooling tower 100 during high cooling demand periods, such as ambient high temperature conditions. The water diversion system 70 can include concurrently forming a plurality of dammed sections 68, for example, in different areas of the cooling portion 20, as required to address maintenance needs, and/or for tuning of the cooling tower 100. In one example shown in FIGS. 10-11, a plurality of basin bays 56 in two different sections are identified to be dammed, including a first dammed section 68A including bay B2, and a second dammed section 68B including bays B3 through B7, where dammed sections 68A, 68B are separated by an undammed section 98A. Dammed section 68A is formed between undammed sections 98A, 98C, and dammed section 68B is formed between undammed sections 98A, 98B, as illustrated in the example shown in FIGS. 10-11. Other dammed sections 68 may be identified at 205 to be formed concurrently with the dammed sections 68, for example, in one or more bays B14 . . . Bn not shown in FIGS. 10-11, to tune or balance the cooling portion 20 during the water diversion event. As shown in FIG. 12, the method 200 continues at 210 with installation of flume dams 62 in each bay 56 included in the dammed sections 68A, 68B identified at 205. For example, and as shown in FIG. 11, flume dam 62B is installed into notch 38 of bay B2 in the dammed section 68A to block water flow from the flume 26. In the illustrative example, flume dams 62A, 62C are installed in the bays B1, B3 immediately adjacent the dammed section 68A, to block water flow from the flume 26 into the bays B1, B3 immediately adjacent the dammed section 68A, diverting the water flow from flume 26 to the next adjacent notches 38 in bays Bn and B4. The flume dams 62A, 62C are examples of and can also be referred to herein as adjacent flume dams, indicating an adjacent flume dam is a flume dam 62 installed in a notch 38 which is located in an undammed section 98 of the flume wall 28. Advantageously, installing adjacent flume dams 62A, 62C in the notches 38 of bays B1 and B3 immediately adjacent the dammed section 68A, reduces the turbulence of water flow in the adjacent bays B1 and B3, and stabilizes the water force exerted on basin dams 64A and 64B from the respective undammed sections 98C and 98A. Further, installing adjacent flume dams 62A, 62C in the notches 38 of bays B1 and B3 immediately adjacent the dammed section 68A diverts water flowing in the flume 26 away from the notches 38 immediately adjacent the dammed section 68A, thus minimizing and/or preventing splash over from the notches 38 in adjacent bays B1 and B3 into the dammed section 68A which may occur if the adjacent basin dams 62A, 62C were not installed. Examples of adjacent flume dams 62D, 62I are shown in FIGS. 10 and 11. The installation of an adjacent flume dam 62 in the undammed section 98 adjacent a basin dam 64 is shown in FIG. 16-19 and further illustrated in FIGS. 20-21.

The method 200 continues at 215 with installation of basin dams 64 at either end of the dammed section 68. In the example shown in the figures, and as previously described, referring to dammed section 68A, basin dams 64A and 64B are installed, respectively, in adjacent bays B1 and B3, in the present example abutting, respectively, the de-icing pipes 34 (see also FIG. 21) such that the water pressure in the undammed bays B1 and B3 exerted against the basin dams 64A and 64B seals the basin dams 64A and 64B to the basin floor 48 and to the de-icing pipe 34 to which each of the basin dams 64A, 64B is abutted. In the installed position, the basin dam 64A blocks water flow from the undammed section 98C into the dammed section 68A, and basin dam 64B blocks water flow from the undammed section 98A into the dammed section 68A.

The method 200 at 220 optionally includes closing valving to the de-icing pipes 34 in the dammed basin section, during inspection, cleaning, and/or maintenance of the de-icing pipes 34. At 225 and 230, water remaining in the dammed section 68 after installing the flume dams 62 and basin dams 64 is removed from the dammed section 68, for example, by pumping the water from the dammed section 68, for example, into the flume 26 or one of the adjacent undammed sections 98, and/or by draining the residual water from the dammed section 68 via the conduits 50 in the basin floor 48 in the dammed section 68. The method 200 at 235 optionally includes installing one or more auxiliary basin dams 90 within the dammed basin section, as previously described herein. At 240, the dammed section 68 can be further sealed by installing and/or inserting plugs 66 in the conduits 50 in the basin floor 48, to block water from draining through the conduits 50 into the fill structure 44 below the dammed section 68 and onto maintenance workers and/or equipment which may be performing work in the fill structure 44 during the water diversion event.

At 245, inspections, maintenance and repairs are conducted in the dammed section 68 which can include, by way of non-limiting example, inspection, cleaning, descaling and other maintenance of the distribution basin 30 in the dammed section 68, including cleaning and descaling of the conduits 50 to increase water flow through the conduits 50, inspection, cleaning, and other maintenance of the de-icing pipes 34, and inspection, cleaning, repair, and other maintenance of the fill structure 44 and/or fill members 46 below the dammed section 68. After completion of the maintenance activities, and as shown in FIG. 12 at 250, 255, 260, the water diversion system 70, including the flume dams 62, basin dams 64, conduit plugs 66, auxiliary basin dam(s) 90, etc., are removed and the de-icing pipes 34 are reopened as required based on operating conditions, to restore water flow to the previously dammed section 68. The method 200 can be repeated on various combinations of bays 56 and cooling zones 60 at maintenance intervals as determined for the cooling tower 100, such that ongoing preventive and corrective maintenance can be conducted on a substantially continuous basis during ongoing operation of the cooling tower 100.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of 'comprising' and "including" to provide more specific embodiments and are also disclosed. As used in this disclosure and in the appended claims, the singular forms "a", "an", "the", include plural referents unless the context clearly dictates otherwise.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A water diversion system for a cooling tower, the cooling tower including a flume, a distribution basin, and a flume wall disposed between the flume and the distribution basin; the flume wall including a plurality of parapets and a plurality of notches distributed peripherally along the flume wall such that a parapet is separated from an adjacent parapet by a notch of the plurality of notches, to allow water to flow from the flume into the distribution basin via the notch; the water diversion system comprising:
- a first flume dam configured to be removably attached to a first parapet of the plurality of parapets and a second parapet of the plurality of parapets to block a first notch of the plurality of notches separating the first and second parapets when the first flume dam is in an installed position; and
- wherein in the installed position the first flume dam is configured to block water from flowing through the first notch from the flume into the distribution basin.

2. The water diversion system of claim 1, wherein the distribution basin is defined by a basin floor extending radially between the flume wall and a basin wall of the cooling tower, the water diversion system further comprising:
- a first basin dam configured to be removably installed into the distribution basin such that the first basin dam extends radially from the first parapet to the basin wall when in a respective installed position such that the first basin dam is in sealing contact with the basin floor;
- a second basin dam configured to be removably installed into the distribution basin such that the second basin dam extends radially from the second parapet to the basin wall when in a respective installed position such that the second basin dam is in sealing contact with the basin floor;
- wherein the first flume dam and the first and second basin dams are configured to cooperatively divide the distribution basin into a dammed section and an undammed section when the first flume dam and the first and second basin dams are in their respective installed positions;
- wherein, in their respective installed positions, the first and second basin dams are configured to block water from flowing into the dammed section from the undammed section of the distribution basin; and
- wherein, in the installed position the first flume dam is configured to block water from flowing from the flume into the dammed section via the first notch.

3. The water diversion system of claim 2, further comprising:
- a second flume dam configured to be removably attached to the first parapet and a third parapet of the plurality of parapets to block a second notch of the plurality of notches separating the first and third parapets when the second flume dam is in a respective installed position;
- wherein, in the respective installed position, the second flume dam is configured to block water from flowing through the second notch from the flume into the undammed section of the distribution basin;
- a third flume dam configured to be removably attached to the second parapet and a fourth parapet of the plurality of parapets to block a third notch of the plurality of notches separating the second and fourth parapets when in a respective installed position; and
- wherein, in the respective installed position, the third flume dam is configured to block water from flowing through the third notch from the flume into the undammed section of the distribution basin.

4. The water diversion system of claim 2, wherein at least one of the first and second basin dams includes:
- a dam plate configured to seal the at least one of the first and second basin dams to each of the basin floor, the flume wall, and the basin wall when the at least one of the first and second basin dams is in a respective installed position.

5. The water diversion system of claim 4, wherein the at least one of the first and second basin dams further includes:
- a sealing element;
- wherein the sealing element is configured to be disposed between the dam plate and the basin floor when the at least one of the first and second basin dams is in the respective installed position.

6. The water diversion system of claim 2, further comprising:
- an auxiliary basin dam configured to extend radially from the flume wall to the basin wall when the auxiliary basin dam is in a respective installed position; and
- wherein, in the respective installed position, the auxiliary basin dam is configured to be positioned within the dammed section of the distribution basin, and intermediate the first and second basin dams.

7. The water diversion system of claim 1, wherein the distribution basin of the cooling tower is defined by a basin floor that extends radially between the flume wall and a basin wall of the cooling tower, and the basin floor defines at least one conduit extending through the basin floor and configured for distributing water from the basin through the basin floor via the at least one conduit; the water diversion system further comprising:
- at least one plug configured to be removably installed into the at least one conduit of the basin floor, such that the at least one plug seals the at least one conduit when in a respective installed position, to block water from flowing from the distribution basin through the at least one conduit.

8. The water diversion system of claim 1, wherein the flume wall of the cooling tower includes a flume face and a basin face, wherein the first flume dam includes:
- a dam plate configured to provide a seal between the first flume dam and the flume face of the flume wall when the first flume dam is in the installed position.

9. The water diversion system of claim 8, wherein each of the first and second parapets of the cooling tower includes a parapet surface; wherein the first flume dam includes:
- at least one bracket attached to the dam plate;
- wherein the at least one bracket is configured to conform to the parapet surface of at least one of the first and second parapets when the first flume dam is in the installed position.

10. The water diversion system of claim 9, further comprising:
- at least one fastener configured to removably attach the at least one bracket to at least one of the first and second parapets when the first flume dam is in the installed position.

11. The water diversion system of claim 8, wherein the first flume dam includes a sealing element configured to be disposed between the dam plate and the flume face of the cooling tower when the first flume dam in in the installed position.

12. The water diversion system of claim 8, further comprising:
- at least one fastener configured to removably attach the first flume dam to at least one of the first and second parapets such that the dam plate is compressed against the flume face of the flume wall to block water from flowing between the dam plate and the flume face when the first flume dam is in the installed position.

13. The water diversion system of claim 1, wherein the distribution basin of the cooling tower is defined by a basin floor that extends radially between the flume wall and a basin wall of the cooling tower, the water diversion system further comprising:
- a first basin dam configured to extend radially from the first parapet to the basin wall when in a respective installed position such that the first basin dam is in sealing contact with the basin floor;
- a second basin dam configured to extend radially from a third parapet to the basin wall when in a respective installed position such that the second basin dam is in sealing contact with the basin floor;
- a second flume dam configured to be removably attached to the second parapet and a third parapet of the plurality of parapets to block a second notch of the plurality of notches separating the second and third parapets when the second flume dam is in a respective installed position;
- wherein, in the respective installed position, the second flume dam is configured to block water from flowing through the second notch from the flume into the distribution basin;
- wherein the first flume dam, the second flume dam, and the first and second basin dams are configured to cooperatively divide the distribution basin into a dammed section and an undammed section when the first and second flume dams and the first and second basin dams are in their respective installed positions;
- wherein, in their respective installed positions, the first and second basin dams are configured to block water from flowing into the dammed section from the undammed section of the distribution basin; and
- wherein in their respective installed positions, the first and second flume dams are configured to block water from flowing from the flume into the dammed section.

14. A method for installing a water diversion system in a cooling tower, the method comprising:
- removably installing a first basin dam such that the first basin dam extends radially from a first parapet of a flume wall of the cooling tower to a basin wall of the cooling tower such that the first basin dam is in sealing contact with a basin floor of the cooling tower;
- removably installing a second basin dam such that the second basin dam extends radially from a second parapet of the flume wall to the basin wall such that the second basin dam is in sealing contact with the basin floor of the cooling tower;
- removably installing a respective flume dam of one or more flume dams to a respective notch of one or more notches distributed along the flume wall of the cooling tower between the first and second parapets, wherein, once installed, the respective flume dam is configured to block water from flowing from a flume of the cooling tower into a distribution basin of the cooling tower through the respective notch;
- wherein, once installed, the one or more flume dams cooperatively block water from flowing from the flume into the distribution basin through the one or more notches distributed along the flume wall of the cooling tower between the first and second parapets; and
- wherein, once installed, the one or more flume dams and the first and second basin dams cooperatively divide the distribution basin of the cooling tower into a dammed section and an undammed section such that, in their respective installed positions, the first and second basin dams are configured to block water from flowing into the dammed section from the undammed section of the distribution basin, and the one or more flume dams are configured to block water from flowing from the flume into the dammed section.

15. The method of claim 14, wherein installing the at least one of the first and second basin dams includes:
- adjusting a length of at least one of the first and second basin dams, such that, once installed, at least one of the first and second basin dams is configured such that a first end of the at least one of the first and second basin dams is in sealing contact with the flume wall of the cooling tower, and a second end of the at least one of the first and second basin dams is in sealing contact with the basin wall of the cooling tower.

16. The method of claim 14, further comprising:
- installing an adjacent flume dam to an adjacent notch on the flume wall of the cooling tower; wherein the adjacent notch is positioned in the undammed section of the cooling tower immediately adjacent one of the first and second parapets, such that the adjacent flume dam is configured to block water from flowing from the flume into the undammed section through the adjacent notch.

17. The method of claim 14, further comprising:
- installing an auxiliary basin dam such that the auxiliary basin dam extends radially from the flume wall to the basin wall such that the auxiliary basin dam is in sealing contact with the basin floor and positioned in the dammed section of the distribution basin intermediate the first and second basin dams.

18. The method of claim 14, further comprising:
- installing a plug in a conduit defined by the basin floor of the cooling tower such that the plug is configured to block water from flowing from the distribution basin through the basin floor via the conduit.

19. The method of claim 14, further comprising:
- wherein installing the respective flume dam to the respective notch comprises:
  - positioning the respective flume dam such that a dam plate of the respective flume dam of the cooling tower is in contact with the flume wall to block the respective notch.

20. The method of claim 19, further comprising:
- fastening, using a fastener, the respective flume dam to the flume wall such that, once fastened, the dam plate is compressed against the flume wall to block water from flowing between the dam plate and the flume wall.

21. The method of claim 14, further comprising:
- removing the first and second basin dams from their respective installed positions such that the flow of water from the undammed section to the dammed section is unblocked.

* * * * *